US010232784B1

(12) United States Patent
Mullen et al.

(10) Patent No.: US 10,232,784 B1
(45) Date of Patent: *Mar. 19, 2019

(54) TUBULAR CONSOLE

(71) Applicant: FORD GLOBAL TECHNOLOGIES, LLC, Dearborn, MI (US)

(72) Inventors: Gary D. Mullen, Plymouth, MI (US); Dennis Sartorello, Cologne (DE); Anthony Ligi, Jr., Chelsea, MI (US); Stephen Neal Jacobsen, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/845,048

(22) Filed: Dec. 18, 2017

(51) Int. Cl.
*B60R 7/04* (2006.01)
*B60N 2/56* (2006.01)
*B60H 1/00* (2006.01)
*B60R 7/08* (2006.01)
*B62D 25/14* (2006.01)
*B60R 11/00* (2006.01)
*B60N 3/10* (2006.01)

(52) U.S. Cl.
CPC ........... *B60R 7/04* (2013.01); *B60H 1/00028* (2013.01); *B60N 2/5628* (2013.01); *B60R 7/08* (2013.01); *B62D 25/142* (2013.01); *B60H 2001/002* (2013.01); *B60N 3/101* (2013.01); *B60R 2011/0008* (2013.01); *B60R 2011/0059* (2013.01)

(58) Field of Classification Search
CPC ..... B60R 7/04; B60R 2011/0007; B60N 2/75; B60N 3/10
USPC .............................................. 296/24.34, 37.8
See application file for complete search history.

(56) References Cited

U.S. PATENT DOCUMENTS

| | | | |
|---|---|---|---|
| 2,419,412 A * | 4/1947 | McArthur | B60N 2/787 297/411.26 |
| 6,513,877 B1 | 2/2003 | Ikeda et al. | |
| 7,401,830 B2 | 7/2008 | Akimoto et al. | |
| 7,503,622 B2 | 3/2009 | Vican | |
| 7,866,722 B2 * | 1/2011 | Shibata | B60R 7/04 296/24.34 |
| 9,428,116 B2 | 8/2016 | Schneider | |
| 9,669,740 B2 | 6/2017 | Hansen et al. | |
| 2010/0013256 A1 * | 1/2010 | Arndt | B60R 7/04 296/24.34 |
| 2014/0284955 A1 * | 9/2014 | Winklbauer | B60R 13/0262 296/24.34 |

* cited by examiner

*Primary Examiner* — Joseph D. Pape
(74) *Attorney, Agent, or Firm* — Vichit Chea; Price Heneveld LLP

(57) ABSTRACT

A motor vehicle console comprises a mount and a pair of exposed parallel tubular members. Each of the tubular members has a forward horizontal section, an intermediate section extending rearwardly in at least partially an upward direction, and a rearward horizontal section, wherein each forward horizontal section is disposed at an elevation horizontally below the rearward horizontal section and each forward horizontal section is operatively coupled with the mount.

20 Claims, 34 Drawing Sheets

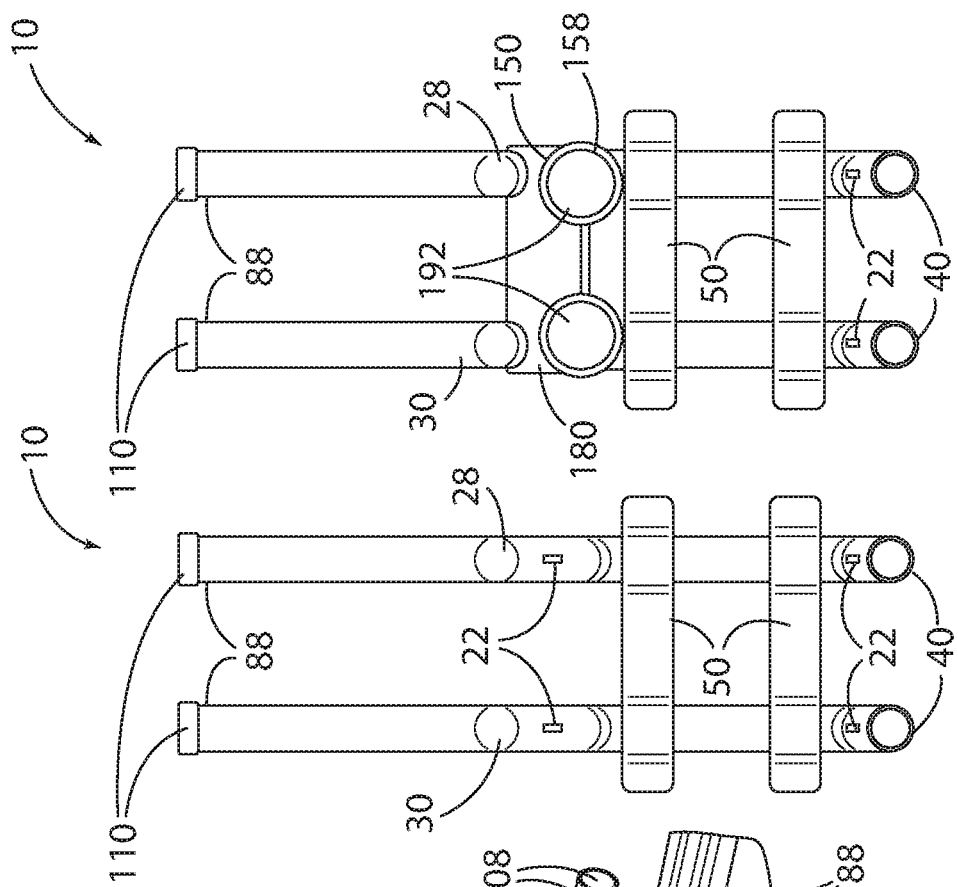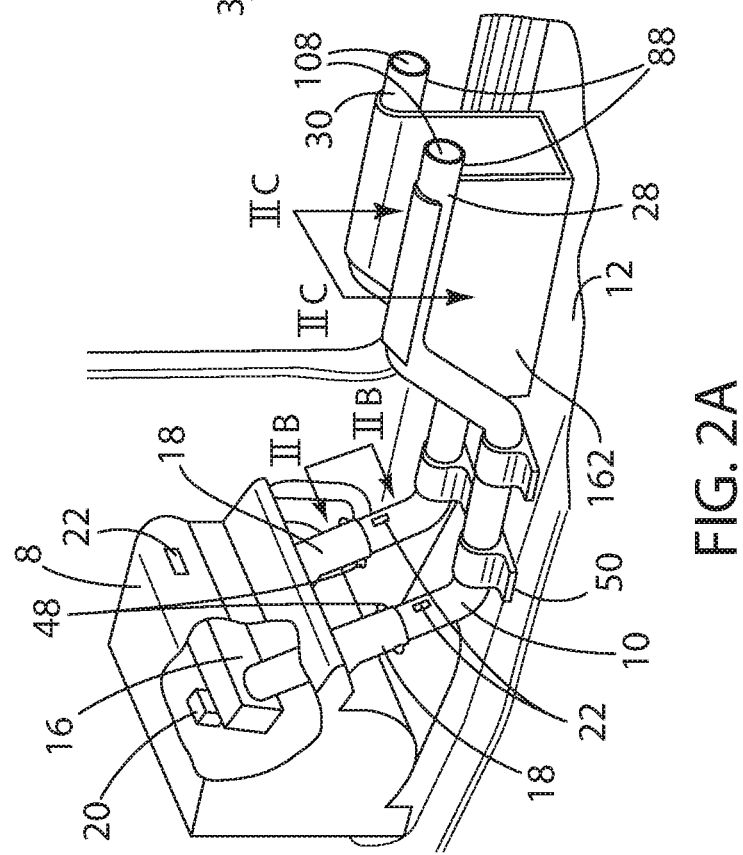

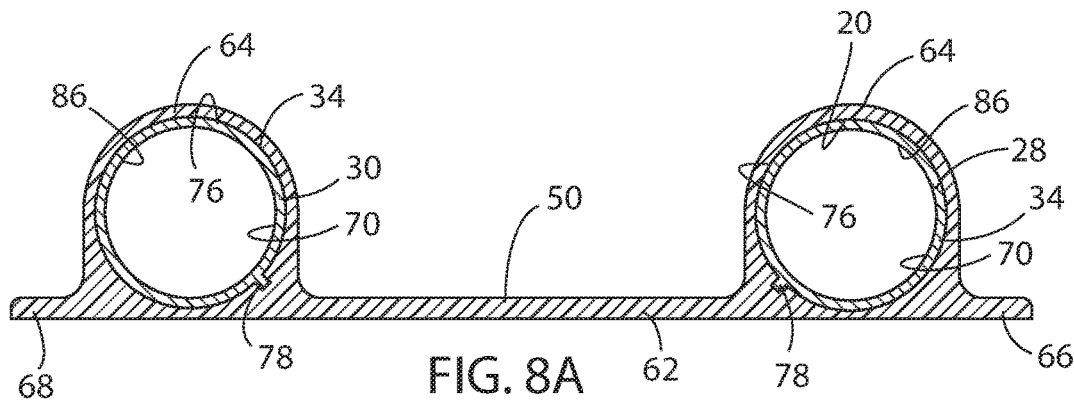
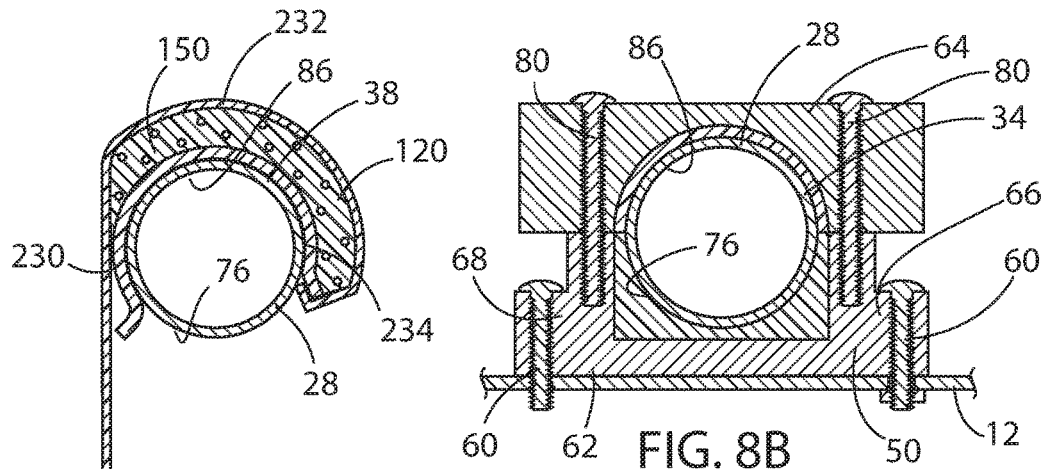
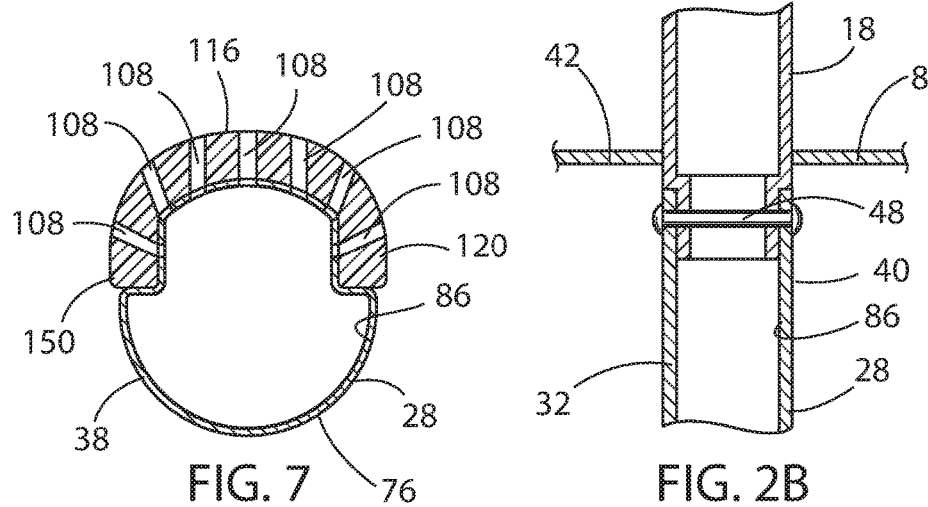

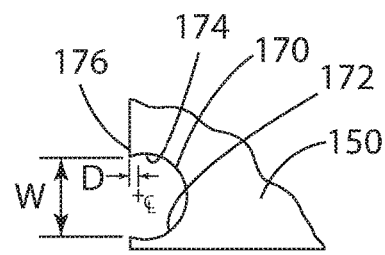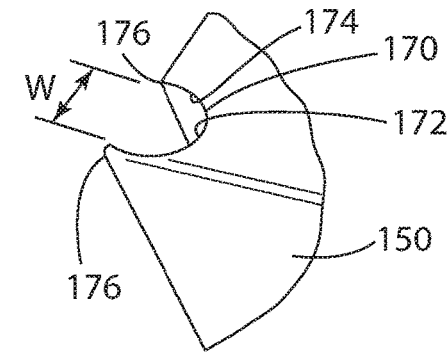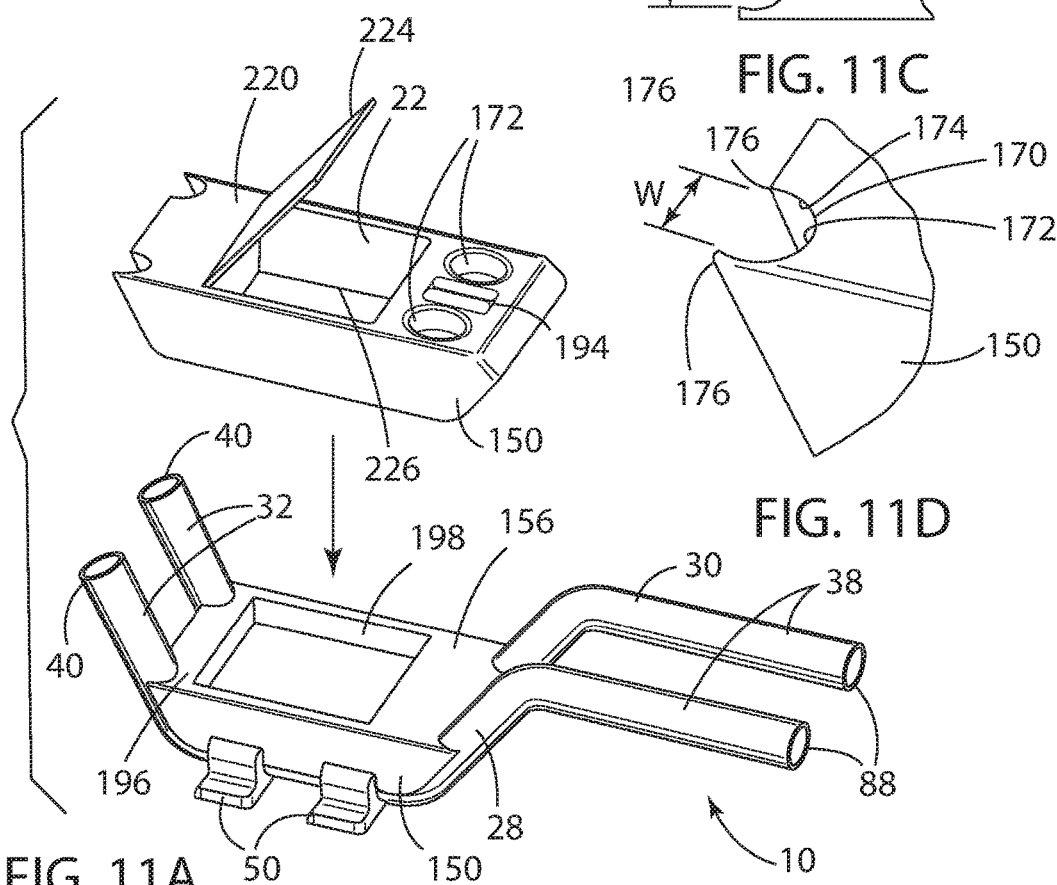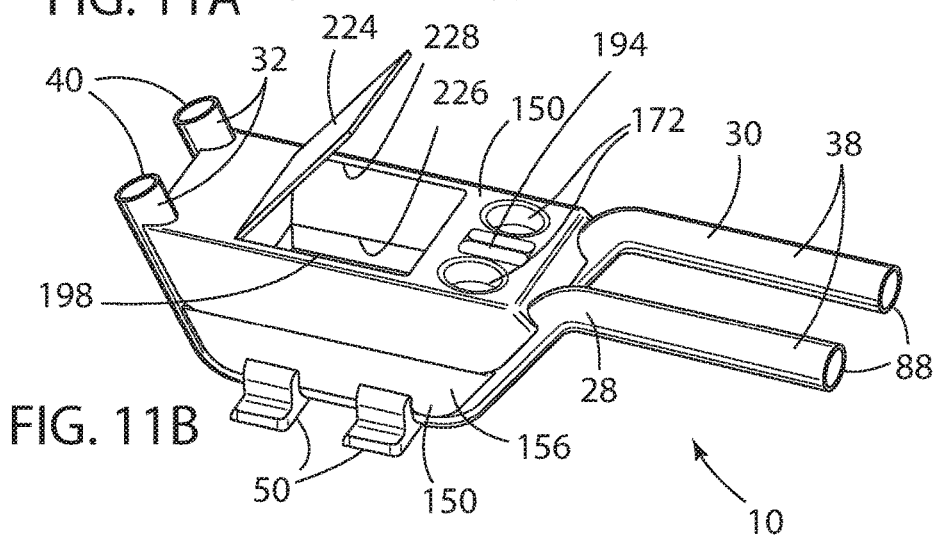

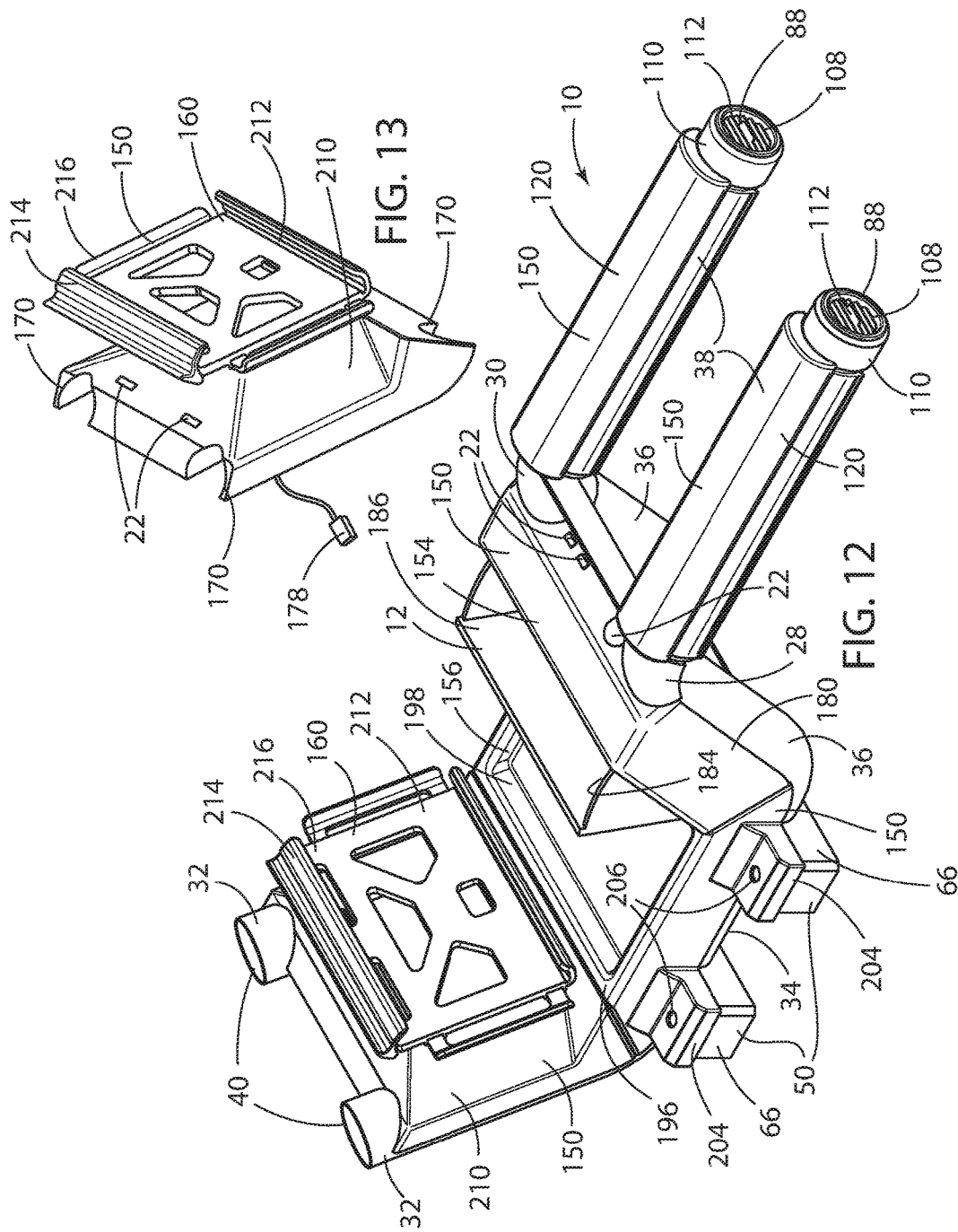

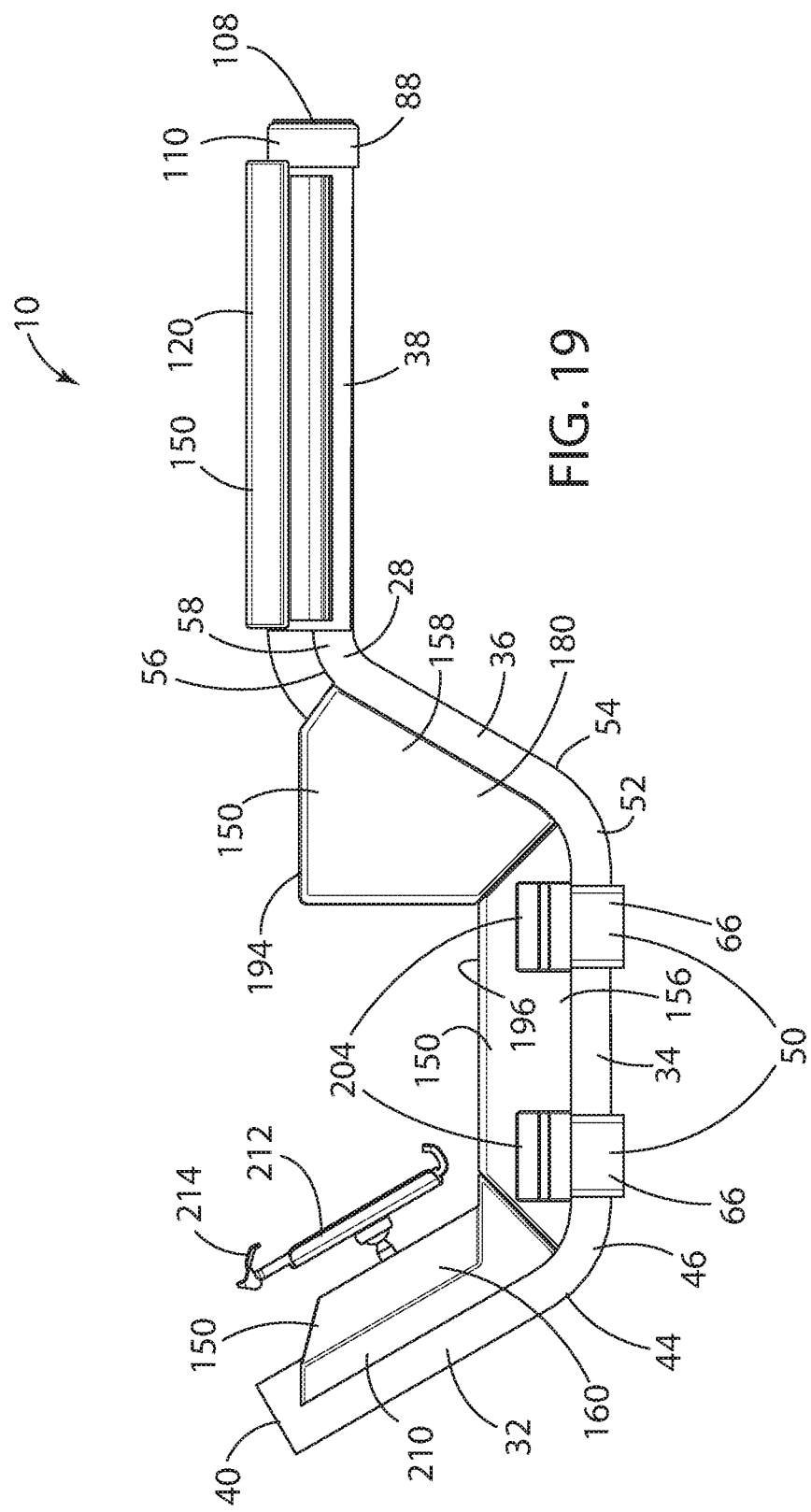

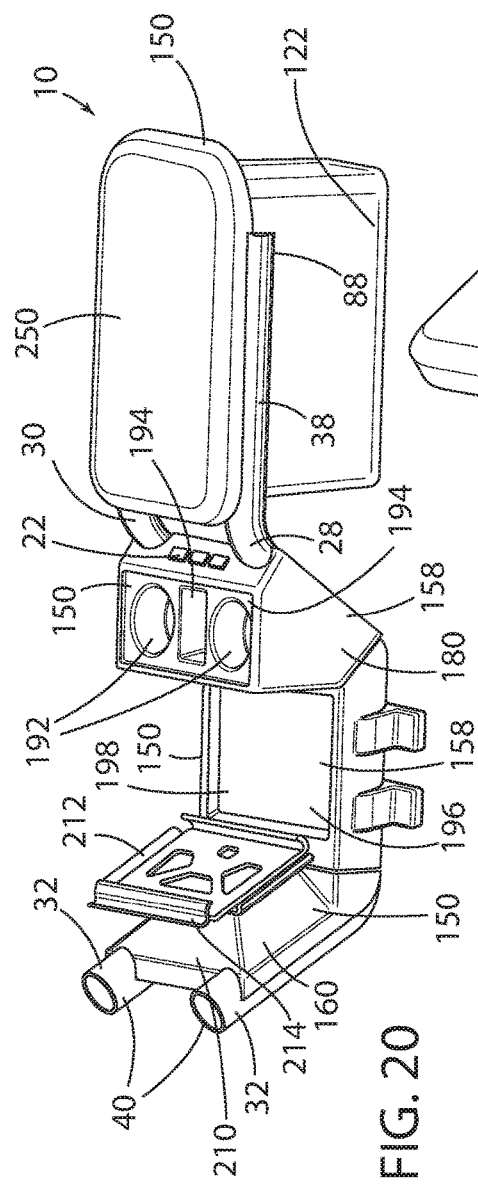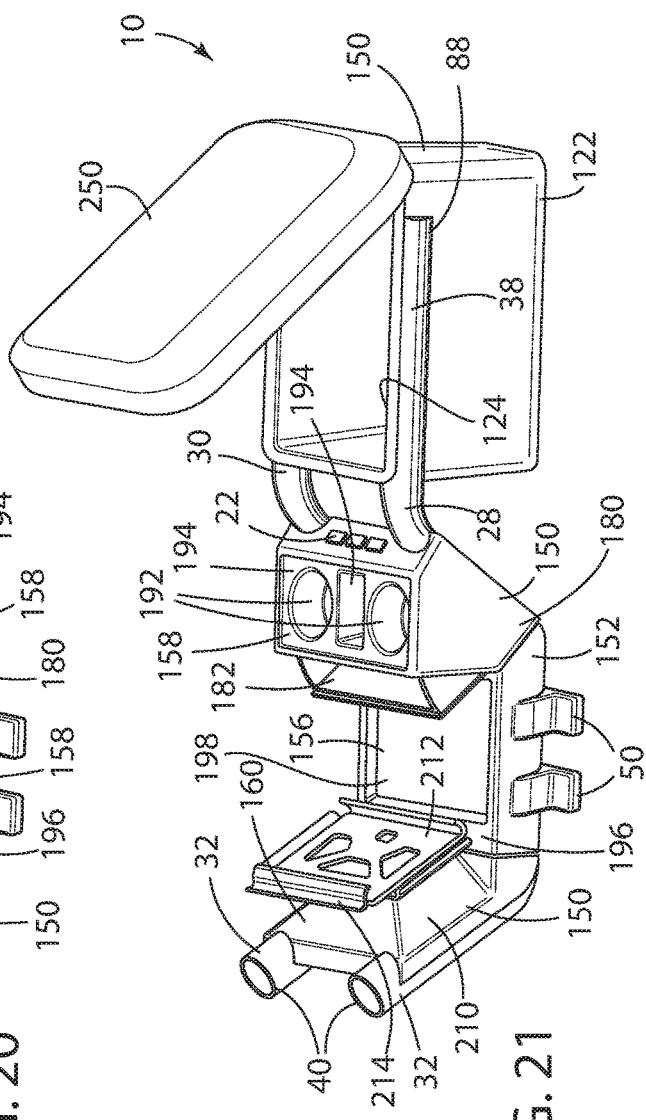

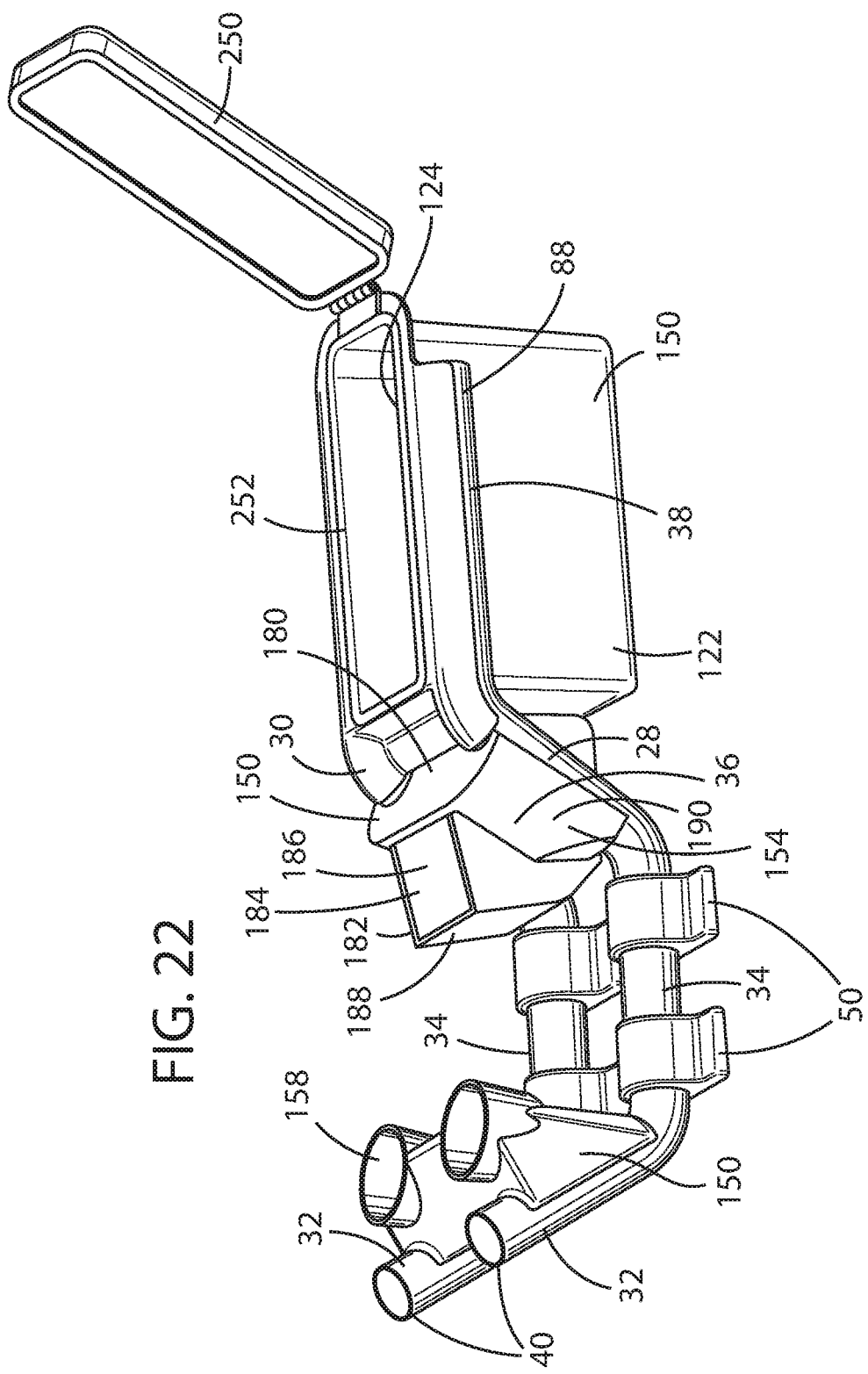

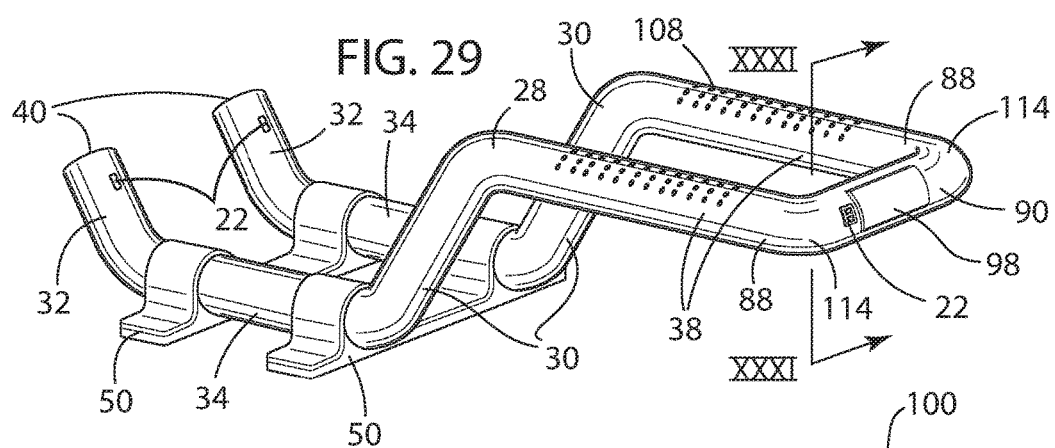
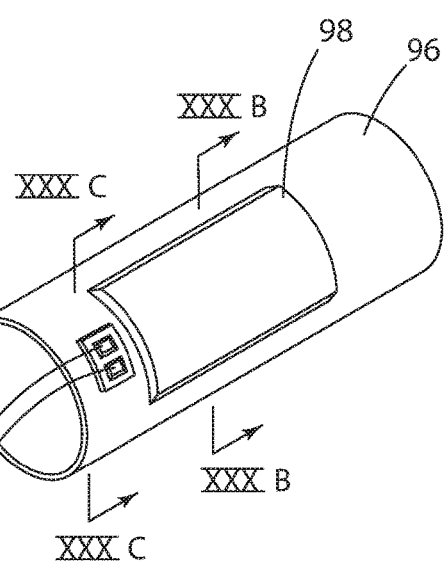
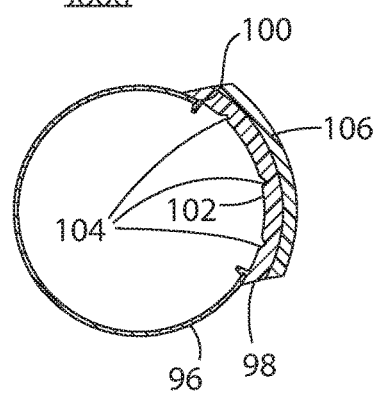
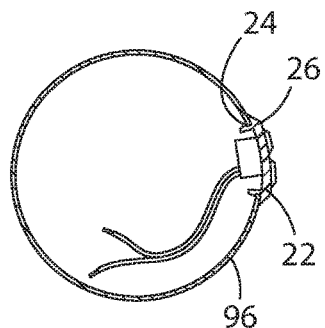

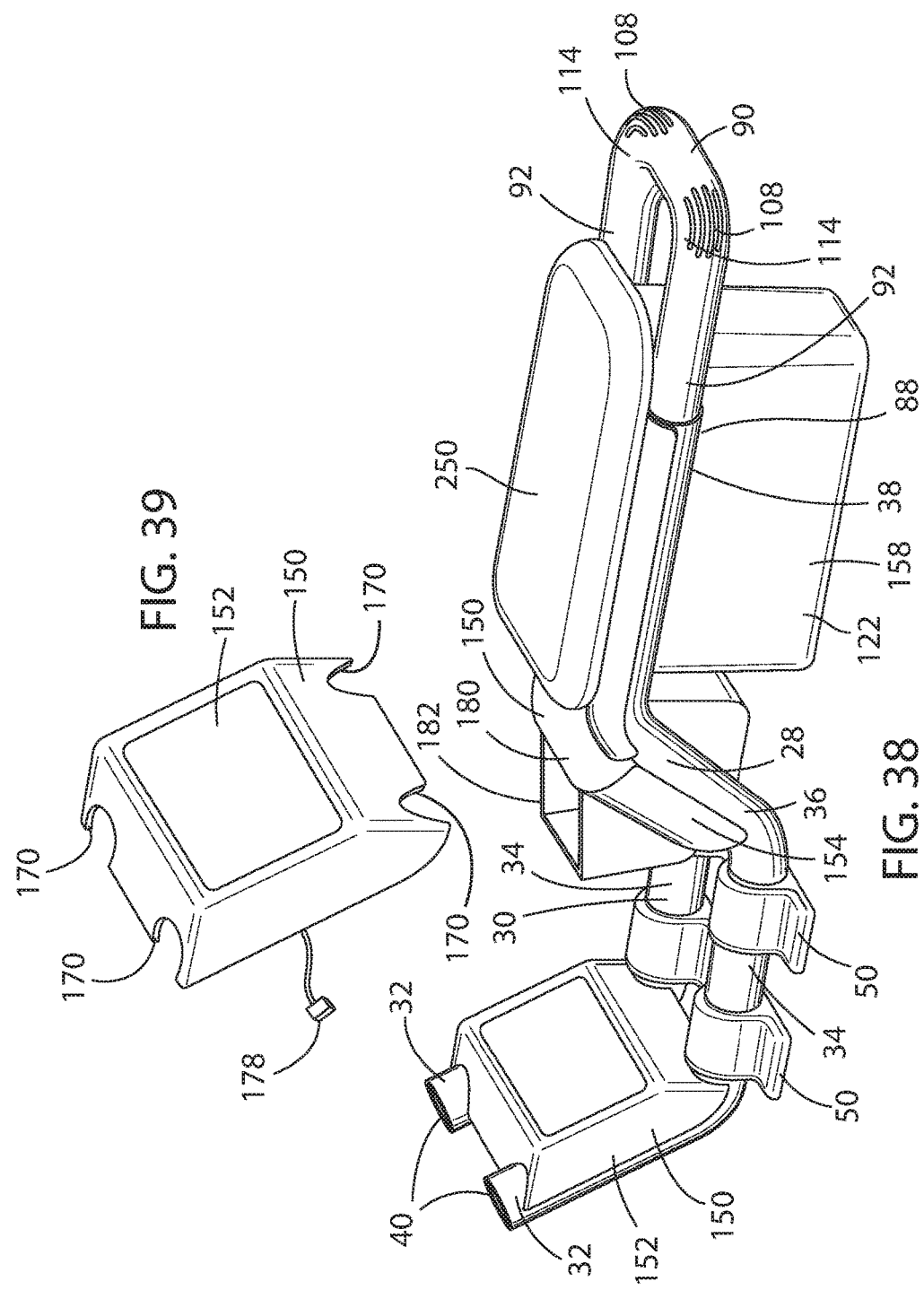

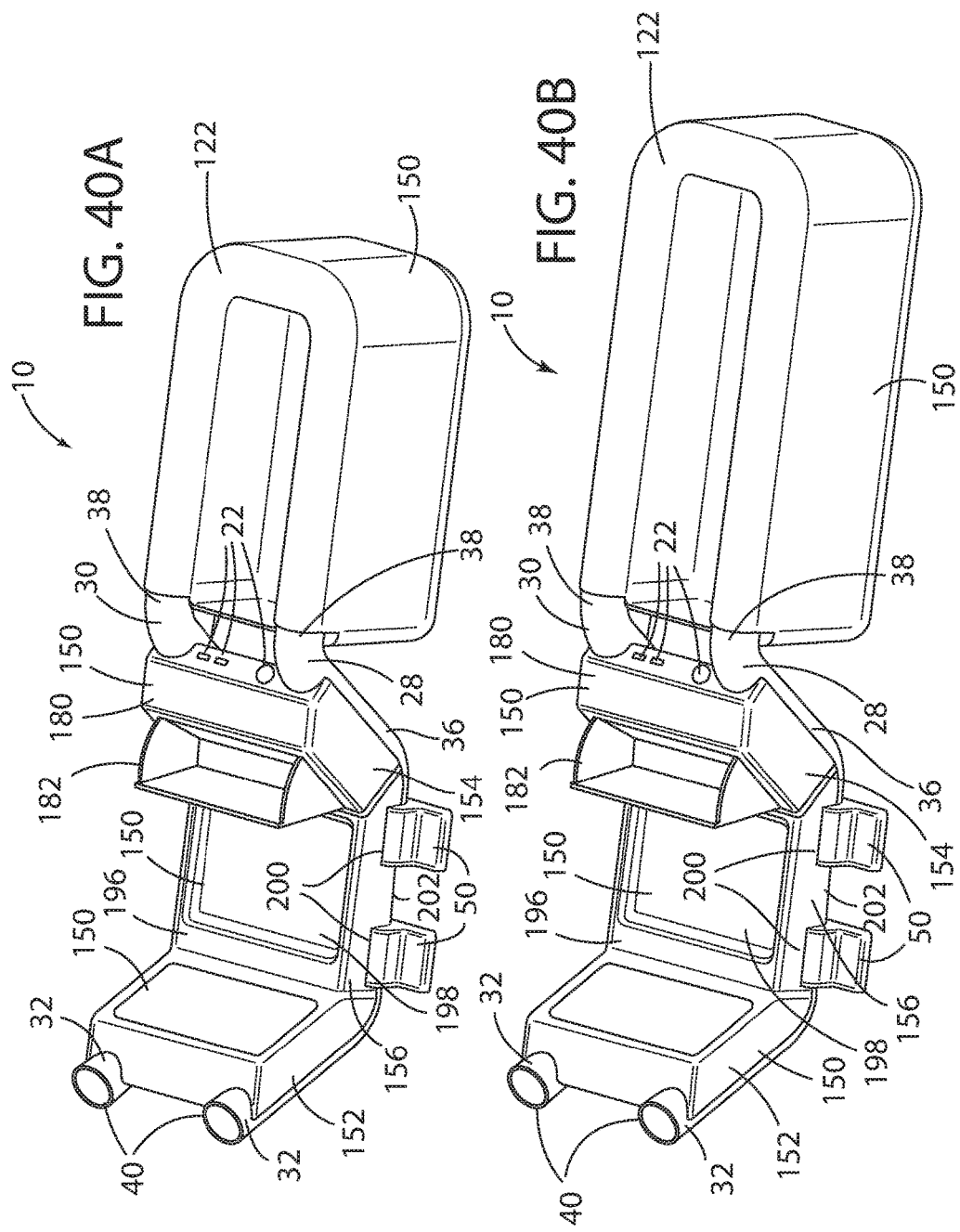

TUBULAR CONSOLE

FIELD OF THE INVENTION

The present invention generally relates to a modular motor vehicle console and, more particularly, a modular motor vehicle center console comprising a pair of exposed parallel tubular members operably coupled with the floorboard and the instrument panel of the motor vehicle that are adapted to interact with a plurality of motor vehicle systems and receive any of a plurality of accessories to assume a number of user-defined configurations.

BACKGROUND OF THE INVENTION

Modern motor vehicle interior components are becoming more and more adaptable as designers improve their understanding of human ergonomics, posture, and comfortability. Motor vehicle interior components have long included a console, typically positioned between the driver and front passenger seating positions, where the center console is often provided with an enclosed compartment that may be opened and closed by the motor vehicle users to store articles. Such consoles may include functional features, such as gear shifters, and convenience features, such as cup holders. For any given motor vehicle make and model, these consoles further represent a significant styling element of the modern motor vehicle interior. As such, prior consoles were commonly designed to conform with or support a particular overall motor vehicle interior design for the given motor vehicle make and model, and were fabricated and assembled as an essentially preconfigured and fixed structure to complete the overall motor vehicle interior design. However, the motor vehicle users of such consoles were unable to configure the console to their particular needs and tastes. Thus, a motor vehicle console that allows the motor vehicle user to customize the functional and convenience features of the console to their particular needs and tastes is desired.

SUMMARY OF THE INVENTION

According to one aspect of the present invention, a console for a motor vehicle comprises a mount, and a pair of exposed parallel tubular members. Each of the tubular members has a forward horizontal section, an intermediate section extending rearwardly in at least partially an upward direction, and a rearward horizontal section, wherein each forward horizontal section is disposed at an elevation horizontally below the rearward horizontal section and each forward horizontal section is operatively coupled with the mount.

Embodiments of the first aspect of the invention can include any one or a combination of the following features:
- A mount and a pair of exposed parallel tubular members, each of the tubular members having a forward horizontal section, an intermediate section extending rearwardly in at least partially an upward direction, and a rearward horizontal section, wherein each forward horizontal section is disposed at an elevation horizontally below the rearward horizontal section and each forward horizontal section is operatively coupled with the mount.
- A rearward end of the forward horizontal section is operatively coupled with a forward end of the intermediate section and a rearward end of the intermediate section is operably coupled with a forward end of the rearward horizontal section, and the intermediate section extends rearwardly and upwardly in about a 45 degree angle relative a horizontal plane.
- The forward horizontal section, intermediate section, and rearward horizontal section of each of the pair of exposed parallel tubular members form a substantially continuous and integral interior cavity extending longitudinally relative the motor vehicle.
- The mount is operably coupled with a floorboard of the motor vehicle.
- The mount extends transversely relative the motor vehicle.
- The mount comprises a substantially planar and elongated lower base and a pair of semi-annular collars operably coupled with and proximate opposed ends of the lower base to define a pair of openings within which the forward horizontal section of each of the pair of exposed parallel tubular members is received and restrained, respectively.
- The lower base and the pair of semi-annular collars are injection molded as a single integrated component around the forward horizontal section of each of the pair of exposed parallel tubular members, respectively.
- The lower base and the pair of semi-annular collars are separate components and the pair of semi-annular collars each further comprise a pair of opposed attachment ears by which the pair of pair of semi-annular collars are operably coupled to the lower base and around an outer circumference of the forward horizontal section of each of the pair of exposed parallel tubular members, respectively.
- A pair of mounts extends transversely relative the motor vehicle and longitudinally spaced one from the other.
- Each of the pair of tubular members are operably coupled one to the other at a distal end of each of the pair of tubular members.
- Each of the pair of tubular members are coupled at the distal end by a transverse member.
- The transverse member comprises an outer surface and a head impact bezel is disposed about at least a portion of the outer surface of the transverse member.
- The forward horizontal section, intermediate section, and rearward horizontal section of each of the pair of exposed parallel tubular members and the transverse member form a substantially continuous and integral interior cavity.
- The transverse member comprises a polymeric component injection molded between each of the pair of tubular members.
- Each of the pair of tubular members comprise a generally circular hydroformed metal tube or the tubular members are formed via a CNC process.

According to a further aspect of the present invention, a motor vehicle console comprises a mount operably coupled with a motor vehicle and extending transversely relative the motor vehicle, and a pair of exposed parallel generally circular tubular members. Each of the tubular members has a forward horizontal section operably coupled with an intermediate section extending rearwardly in at least partially an upward direction and operably coupled with a rearward horizontal section, wherein each forward horizontal section is disposed below the rearward horizontal section and each forward horizontal section is operatively coupled with the mount, and wherein each of the pair of tubular members are coupled at a distal end of the rearward horizontal section by a transverse member slidably received within the distal end of each of the pair of tubular members, the transverse member being adapted for longitudinal movement relative the distal end of each of the pair of tubular members.

According to another aspect of the present invention, a motor vehicle console comprises a pair of mounts operably coupled with a motor vehicle and extending transversely relative the motor vehicle, and a pair of exposed parallel tubular members laterally displaced one from the other. Each of the tubular members has a forward horizontal section, an intermediate section extending rearwardly in at least partially an upward direction, and a rearward horizontal section, wherein each forward horizontal section is disposed at an elevation horizontally below the rearward horizontal section, and wherein each forward horizontal section of each of the pair of tubular members is operatively coupled with one of the pair of mounts.

The TUBULAR CONSOLE is also disclosed in co-pending and commonly assigned patent applications to Ford Global Technologies, LLC, filed on this day, entitled TUBULAR CONSOLE AND SYSTEMS THEREFOR and TUBULAR CONSOLE AND ACCESSORIES THEREFOR, the entire contents of which are hereby incorporated herein by reference in their entirety.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2A is a perspective side view of a portion of the motor vehicle interior within which is installed the console of FIG. 1, wherein a sling is installed;

FIG. 2B is a cross-sectional view of one of the connector sections of the pair of tubular members of the motor vehicle console of FIG. 2 and a lower portion of the instrument panel, taken along the line II B-II B in FIG. 2A;

FIG. 2C is a cross-sectional view of one of the rearward horizontal sections of the motor vehicle console of FIG. 2 and the sling, taken along the line II C-II C in FIG. 2A;

FIG. 3 is a top view of the motor vehicle console of FIG. 1;

FIG. 4 is top view of the motor vehicle console of FIG. 1, wherein a cup holder assembly is installed;

FIG. 7 is a cross-sectional view of the rearward horizontal section and elbow pad of the motor vehicle console of FIG. 6, taken along the line VII-VII in FIG. 6;

FIG. 8A is a cross-sectional view of the mount of the motor vehicle console of FIG. 5, taken along the line VIII A-VIII A in FIG. 5;

FIG. 8B is a cross-sectional view of another embodiment of the mount of the motor vehicle console of FIG. 5, taken along the line VIII A-VIII A in FIG. 5;

FIG. 11A is an exploded perspective side view of the motor vehicle console of FIG. 1, wherein a tray assembly is installed and a bridge module is detached;

FIG. 11B is a perspective side view of the motor vehicle console of FIG. 11, wherein the tray assembly and the bridge module are installed;

FIG. 11C is a partial top view of the corner and the removable clamp of the bridge module of FIG. 11A;

FIG. 11D is a partial perspective side view of the corner and the removable clamp of the bridge module of FIG. 11A;

FIG. 12 is a perspective side view of the motor vehicle console of FIG. 1, wherein a tablet device clamp assembly, tray assembly, storage bin, and elbow pads are installed;

FIG. 13 is a perspective side view of the tablet device clamp assembly of FIG. 12;

FIG. 19 is a side view of the motor vehicle console of FIG. 14;

FIG. 20 is a perspective side view of the motor vehicle console of FIG. 1, wherein the tablet device clamp assembly, tray assembly, cup holder assembly, and storage bin in the closed position are installed;

FIG. 21 is a perspective side view of the motor vehicle console of FIG. 20, wherein the storage bin is in the open position;

FIG. 22 is a perspective side view of the motor vehicle console of FIG. 1, wherein the cup holder assembly, closable bin, and storage bin in the open position are installed;

FIG. 29 is a perspective side view of still another embodiment of the motor vehicle console of the present disclosure, further comprising a transverse member;

FIG. 30A is a perspective rear view of a portion of the transverse member of the motor vehicle console of FIG. 29;

FIG. 30B is a cross-sectional view of the transverse member of the motor vehicle console of FIG. 30A, taken along the line XXX B-XXX B in FIG. 30A;

FIG. 30C is a cross-sectional view of the transverse member of the motor vehicle console of FIG. 30A, taken along the line XXX C-XXX C in FIG. 30A;

FIG. 38 is a perspective side view of the motor vehicle console of FIG. 35, wherein the touchscreen module, closable bin, and storage bin are installed;

FIG. 39 is a perspective view of the touchscreen module of FIG. 38;

FIG. 40A is a perspective side view of the motor vehicle console of FIG. 35, wherein the touchscreen module, tray assembly, closable bin, and shorter storage bin are installed;

FIG. 40B is a perspective side view of the motor vehicle console of FIG. 35, wherein the touchscreen module, tray assembly, closable bin, and longer storage bin are installed;

DETAILED DESCRIPTION OF THE PREFERRED EMBODIMENTS

Figure 1:
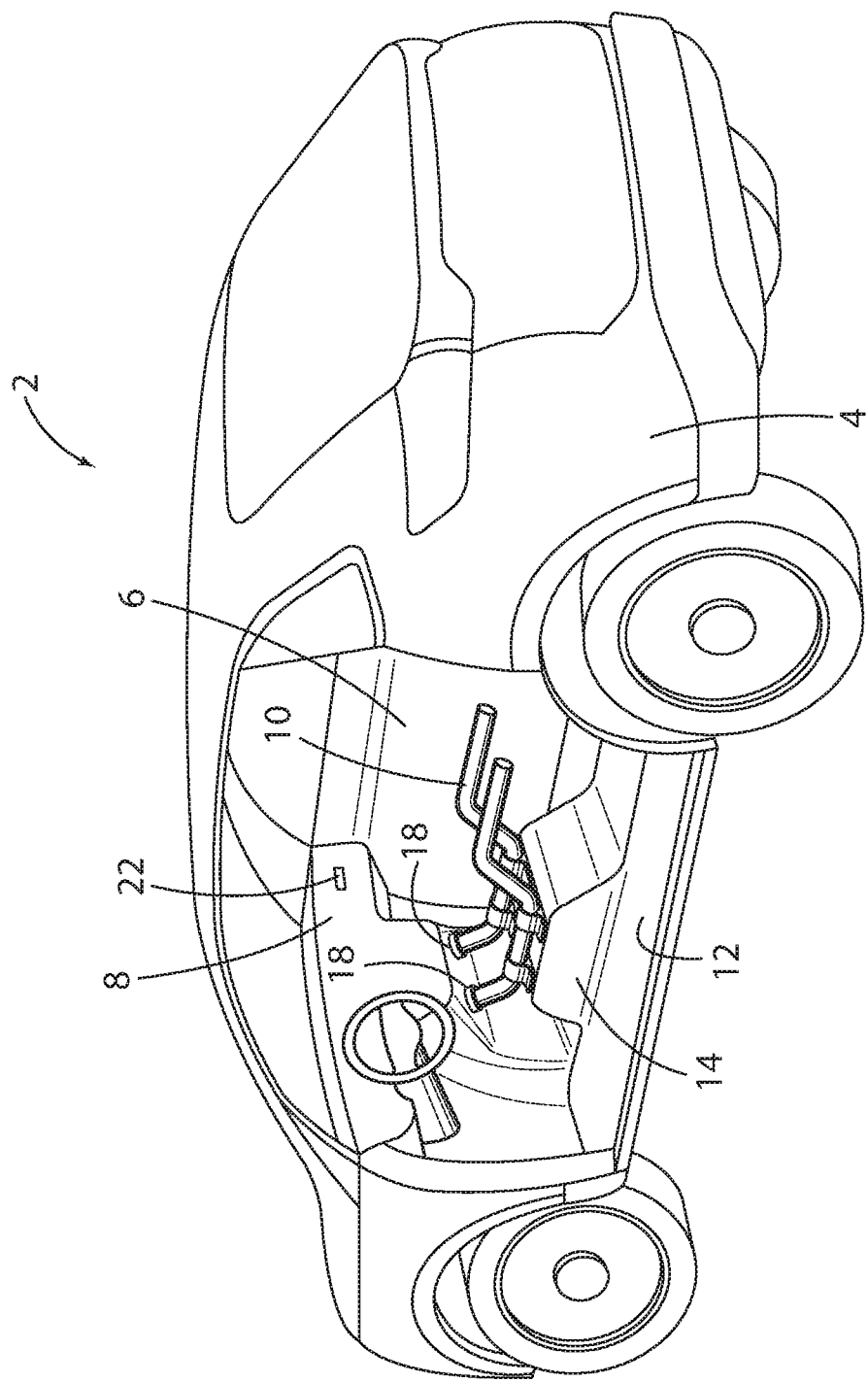
FIG. 1 is a perspective side view of a motor vehicle and interior thereof within which is installed an embodiment of the console of the present disclosure.
Figure 5:
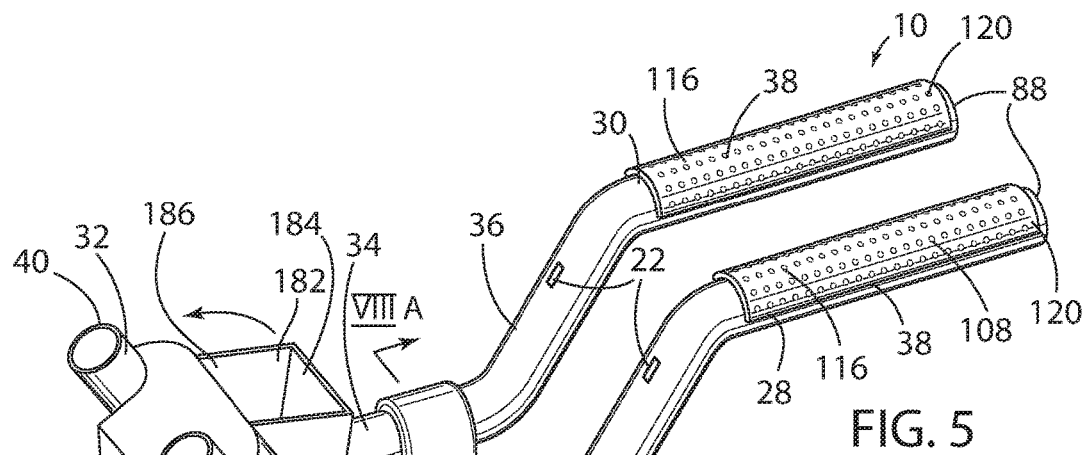
FIG. 5 is an perspective side view of the motor vehicle console of FIG. 1, wherein a storage bin in an open position and an elbow pad are installed.
Figure 6:
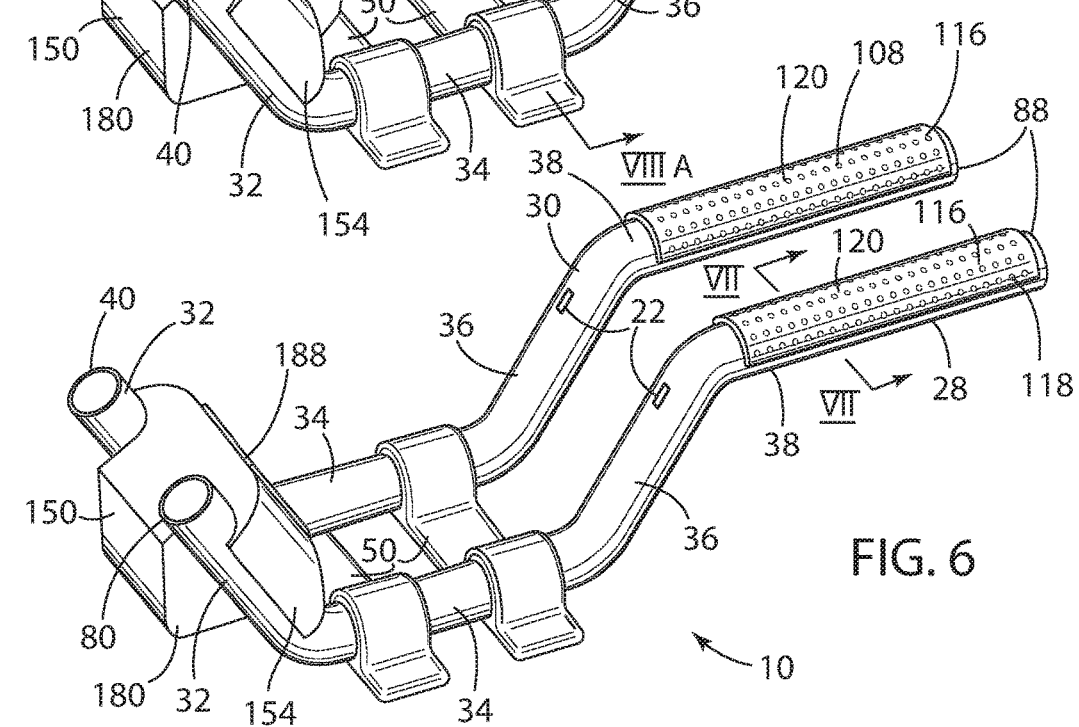
FIG. 6 is a perspective side view of the motor vehicle console of FIG. 5, wherein the storage bin is in the closed position.

As referenced in the Figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Referring to the FIG. 1, reference numeral 10 generally designates a motor vehicle console for a motor vehicle 2 having a body 4 and a passenger compartment 6. Within the passenger compartment 6, an instrument panel 8 is situated in front of the driver and passenger seating positions (not shown) and the motor vehicle console 10 is mounted to a floorboard 12 of the motor vehicle 2 substantially along the centerline of the motor vehicle 2 and extending in a longitudinal axis of the motor vehicle 2. Depending on the functional and styling requirements of the motor vehicle 2, the floorboard 12 may have a raised center portion 14 upon which the center console 10 is mounted, as shown in FIG. 1, or a substantially flat floorboard 12 may be provided, as shown in FIG. 2A.

The instrument panel 8, as is known, may be equipped with the various gauges and controls by which the motor vehicle 2 may be operated, as well as a heating, ventilation, and air conditioning (HVAC) system 16 housed within the instrument panel 8. The HVAC system 16 is provided with outlet ducts 18 by which the heated and cooled air flow from the HVAC system 16 is distributed to the passenger compartment 6. In addition, a data transmission network or electrical power supply 20 may be installed within the instrument panel 8, with access outlets 22 to the data transmission network or electrical power supply 20 provided on the instrument panel 8. A particularly advantageous access outlet 22 includes a USB charging port, by which various digital devices, such as cell phones, tablets, and laptop computers, may be connected with the onboard data transmission network and/or electrical power supply 20. As further discussed below, holes 24 for the access outlets 22 may be cut through the walls of the center console 10 by a laser cutting process, after which the access outlets 22 can be sealed with the tubular member 28 by a gasket seal or a simple cap molding 26, as shown in FIG. 30C.

As shown in FIG. 1, as is typical, the console 10 may be centrally disposed between the driver and passenger seating positions for access by either the driver or passenger. Also, as is typical, the console 10 may be mounted to the floorboard 12 of the motor vehicle 2. However, the console 10 according to the present disclosure provides significant improvements, as more fully described below.

Referring to the Figures, the console 10 according to the present disclosure includes a pair of exposed parallel tubular members 28, 30 extending along the longitudinal axis of the motor vehicle 2 and arranged substantially parallel one to the other separated laterally, preferably by a distance of approximately 300 to 400 mm. Each of the tubular members 28, 30 has a connector section 32, a forward horizontal section 34, an intermediate section 36 extending rearwardly in at least partially an upward direction, and a rearward horizontal section 38.

Figure 31:
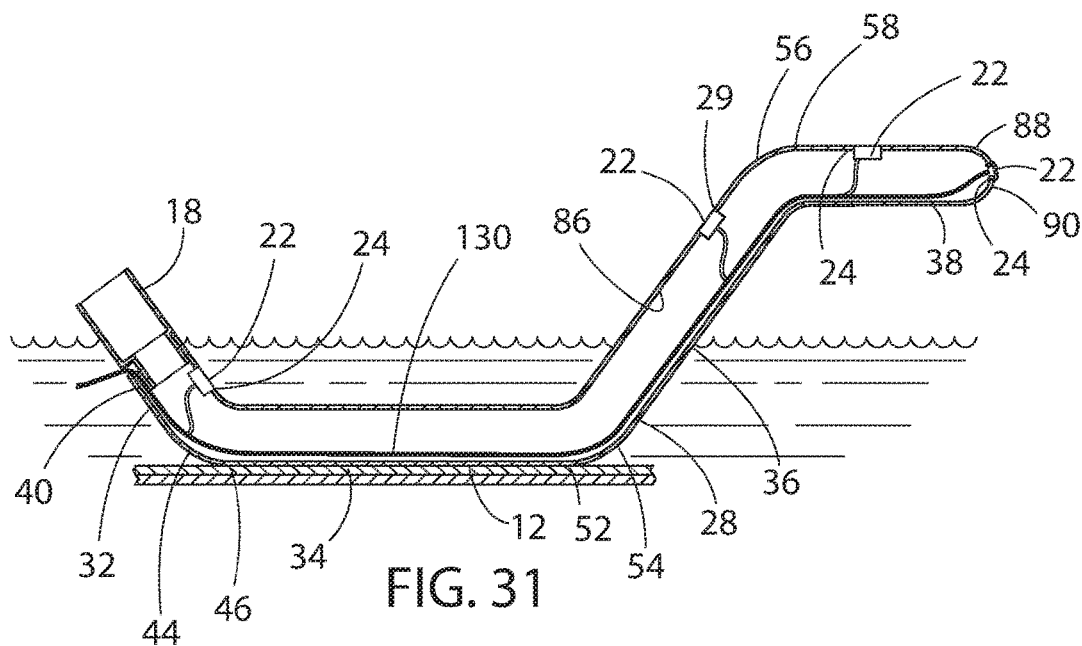
FIG. 31 is a cross-sectional view of the motor vehicle console of FIG. 29 and a lower portion of the instrument panel, taken along the line XXXI-XXXI in FIG. 29, further comprising a transverse member.

A first forward end 40 of the connector sections 32 is preferably operably coupled with the outlet ducts 18 of the instrument panel 8, which are preferably operably coupled with a lower portion 42 of the instrument panel 8, as shown in FIG. 2B, and extends rearwardly in at least partially a downward direction. As best shown in FIGS. 19 and 31, a rearward end 44 of the connector section 32 is operably coupled with a forward end 46 of the forward horizontal section 34. The interface of the instrument panel 8 and connector section 32 is preferably obtained through a reduced diameter in the instrument panel outlet duct 18 that is received within the first forward end 40 of the connector section 32 and a chrome plated or anodized cross bolt 48 extending therethrough, as shown in FIGS. 2A and 2B. Preferably, the resulting structure distributes the load from the weight of the instrument panel 8 over a large area of the floorboard 12 via the tubular members 28, 30.

As shown in the Figures, each forward horizontal section 34 of the pair of tubular members 28, 30 is disposed at an elevation horizontally below the rearward horizontal section 38. Preferably, each forward horizontal section 34 is also operatively coupled with a mount 50 operably coupled to the floorboard 12 of the motor vehicle 2. A rearward end 52 of the forward horizontal section 34 is operatively coupled with a forward end 54 of the intermediate section 36, and a rearward end 56 of the intermediate section 36 is operably coupled with a forward end 58 of the rearward horizontal section 38, as also best seen in FIGS. 19 and 31. Preferably, the connector section 32 extends rearwardly and downwardly in about a 45 degree angle relative a horizontal plane and the intermediate section 36 extends rearwardly and upwardly in about a 45 degree angle relative a horizontal plane, as shown in FIGS. 19 and 31.

The mount 50 may be operably coupled to the floorboard 12 by a fastener, clamp, or other device 60, as shown in FIG. 8B, that provides a reliable mechanical attachment. As shown in the Figures, the mount 50 extends transversely relative the longitudinal axis of the motor vehicle 2 and, as best shown in FIG. 8A, includes a substantially planar and elongated lower base 62 and a pair of semi-annular collars 64 operably coupled with and proximate opposed ends 66, 68 of the lower base 62. A pair of openings 70 aligned with the longitudinal axis of the motor vehicle 2 is thus defined by the mount 50 within which the forward horizontal section 34 of each of the pair of tubular members 28, 30 may be received and restrained, respectively.

Figure 37:
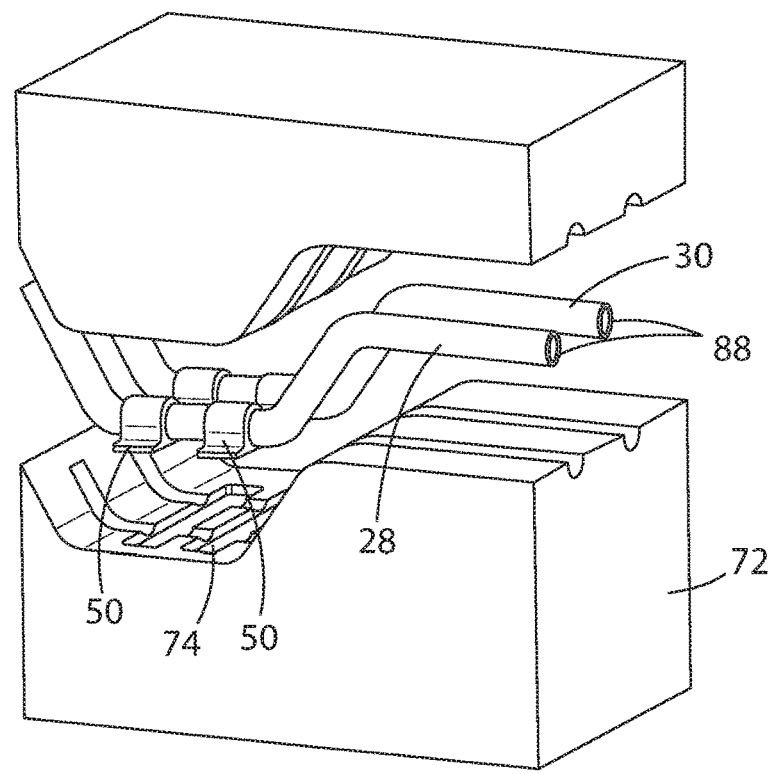
FIG. 37 is a perspective side view of injection molding die assembly for the motor vehicle console of the present disclosure.

The lower base 62 and the pair of semi-annular collars 64 are preferably injection molded as an over-molded single integrated component around the forward horizontal section 34 of each of the pair of tubular members 28, 30, respectively. For example, as shown in FIG. 37, the pair of tubular members 28, 30 may be inserted within a die 72, and the polymeric material for the mounts 50, which is preferably a fiberglass filled or carbon fiber filled thermoplastic, is injected into the cavity 74 for the mount. The pair of tubular members 28, 30 may then be removed as an assembly, with the mount 50 completely enclosing the outer perimeter 76 of each of the forward horizontal section 34 of the pair of tubular members 28, 30, as shown in FIG. 8A. In addition, the outer perimeter 76 of the forward horizontal section 34 of the tubular members 28, 30 enclosed by the over-molded mount 50 may be provided with a protrusion 78 or the like that surrounds and is captured by the molded material to provide structural stability to the interface of the forward horizontal section 34 and the mount 50.

Alternatively, as shown in FIG. 8B, the mount 50 may comprise separate components and may include a lower base 62 having a pair of opposed ends 66, 68 by which the mount 50 may be attached to the floorboard 12 by fasteners 60. The mount 50 may also include a discrete semi-annular collar 64 operably coupled to the lower base 62 and about the outer perimeter 76 of the forward horizontal section 34 of each of the pair of tubular members 28, 30, respectively. The semi-annular collar 64 may be attached to the lower base 62 by fasteners 80, whereby a spacer 82 may be sandwiched between the lower base 62 and the semi-annular collar 64 to receive and restrain the forward horizontal section 34 of the tubular members 28, 30. In the foregoing configuration, a pair of mounts 50 may be arranged in lateral side-to-side orientation so as to receive and restrain each of the pair of tubular members 28, 30.

Figure 10:
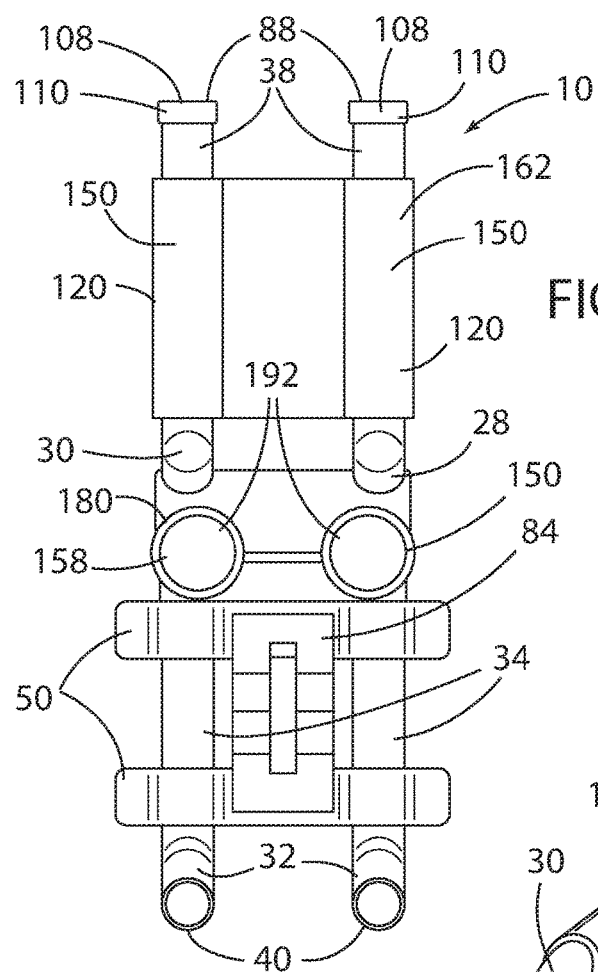
FIG. 10 is a top view of the motor vehicle console of FIG. 9, wherein the shifter assembly, cup holder assembly, and sling are installed.
Figure 9:
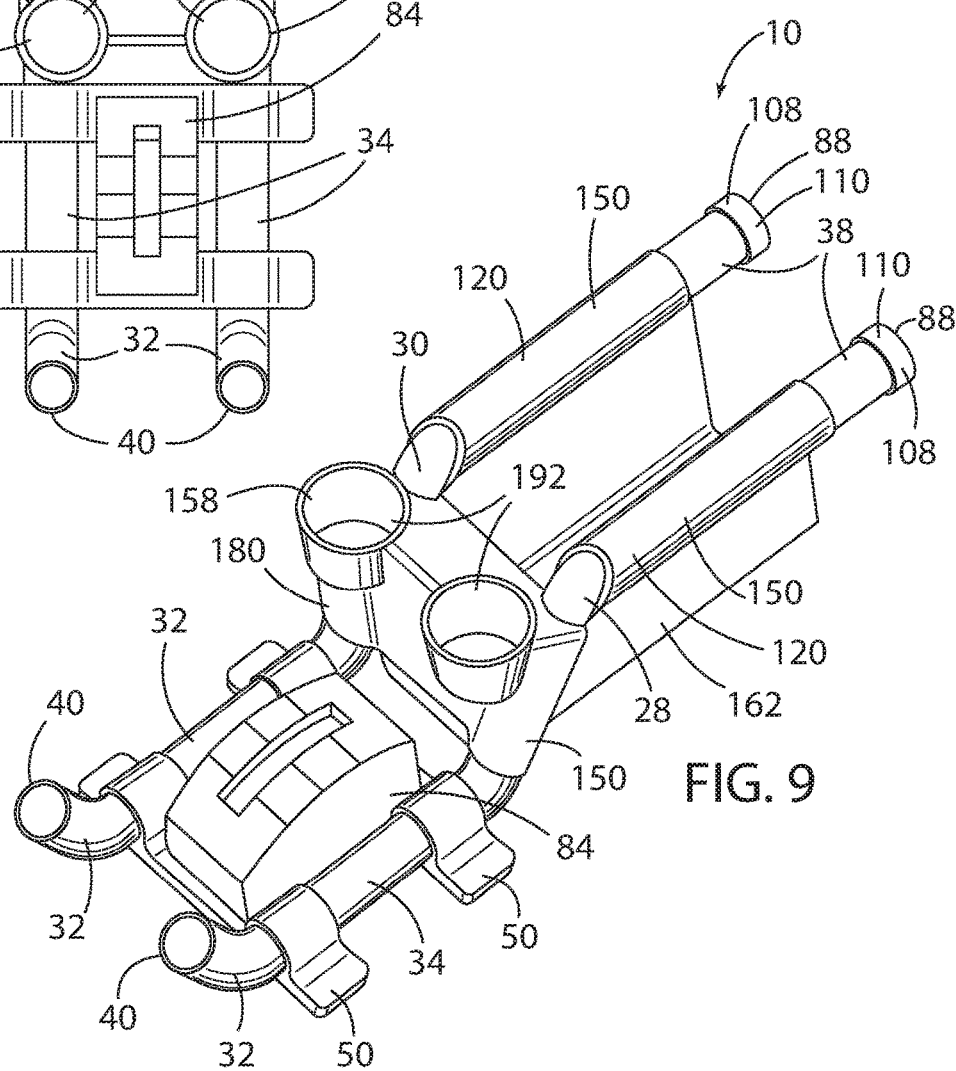
FIG. 9 is a perspective side view of the motor vehicle console of FIG. 1, wherein a shifter assembly, cup holder assembly, and sling are installed.

In either case, as shown in the Figures, a pair of mounts 50 may be preferably provided, wherein each of the mounts 50 extends transversely one to the other relative the motor vehicle and are longitudinally spaced one from the other. It has been found that use of a pair of mounts 50 tends to minimize rotation of the console 10 relative the vertical axis of the motor vehicle 2. In addition, as shown in FIGS. 9 and 10, a shifter assembly 84 may be mounted to the mount 50 between the pair of tubular members 28, 30.

Each of the tubular members 28, 30 is preferably formed as a continuous hollow metal tube that is bent to form the aforementioned sections. The connector section 32, forward horizontal section 34, intermediate section 36, and rearward horizontal section 38 of each of the pair of tubular members 28, 30 thus form a substantially continuous and integral interior cavity 86 extending longitudinally relative the motor vehicle 2. The preferred material for each of the tubular members 28, 30 is steel, which is relatively inexpensive, rigid, and may be readily painted in various colors and finishes to match or complement the interior of the passenger compartment 6. When the tubular members 28, 30 are fabricated from steel, they may also be e-coat painted to create a premium finish. However, aluminum may also be used as material for the tubular members 28, 30, although aluminum, while lighter in weight, tends to be more expensive and difficult to form. Tubular members 28, 30 fabricated from aluminum may also be e-coat painted or anodized to create a premium finish. In either case, the tubular members 28, 30 may be formed by a hydroforming process or a CNC process, as is known. The tubular members 28, 30 may also be constructed from individual segments fitted one to the other, so long as the aforementioned continuous hollow configuration is obtained.

The tubular members 28, 30 are preferably formed to have a circular cross-sectional configuration and each preferably have an outer diameter of approximately 40 to 60 mm. When the tubular members 28, 30 are fabricated from steel, each of the tubular members 28, 30 preferably has a wall thickness of approximately 1.5 mm extending substantially throughout the overall longitudinal length of each of the tubular members 28, 30.

As noted in relation to the embodiment described above, each of the pair of tubular members 28, 30 may be independently supported and restrained by the mount 50. However, it is contemplated that an additional embodiment may be employed whereby each of rearward horizontal sections 38 of the pair of tubular members 28, 30 may be operably coupled one to the other at a distal end 88 of each of the pair of tubular members 28, 30 in order to provide further structural rigidity and opportunities for additional features, as noted below. In particular, as shown in FIGS. 24-36, 38-44, the pair of tubular members 28, 30 may be coupled at the distal end 88 by a transverse member 90.

Figure 24:
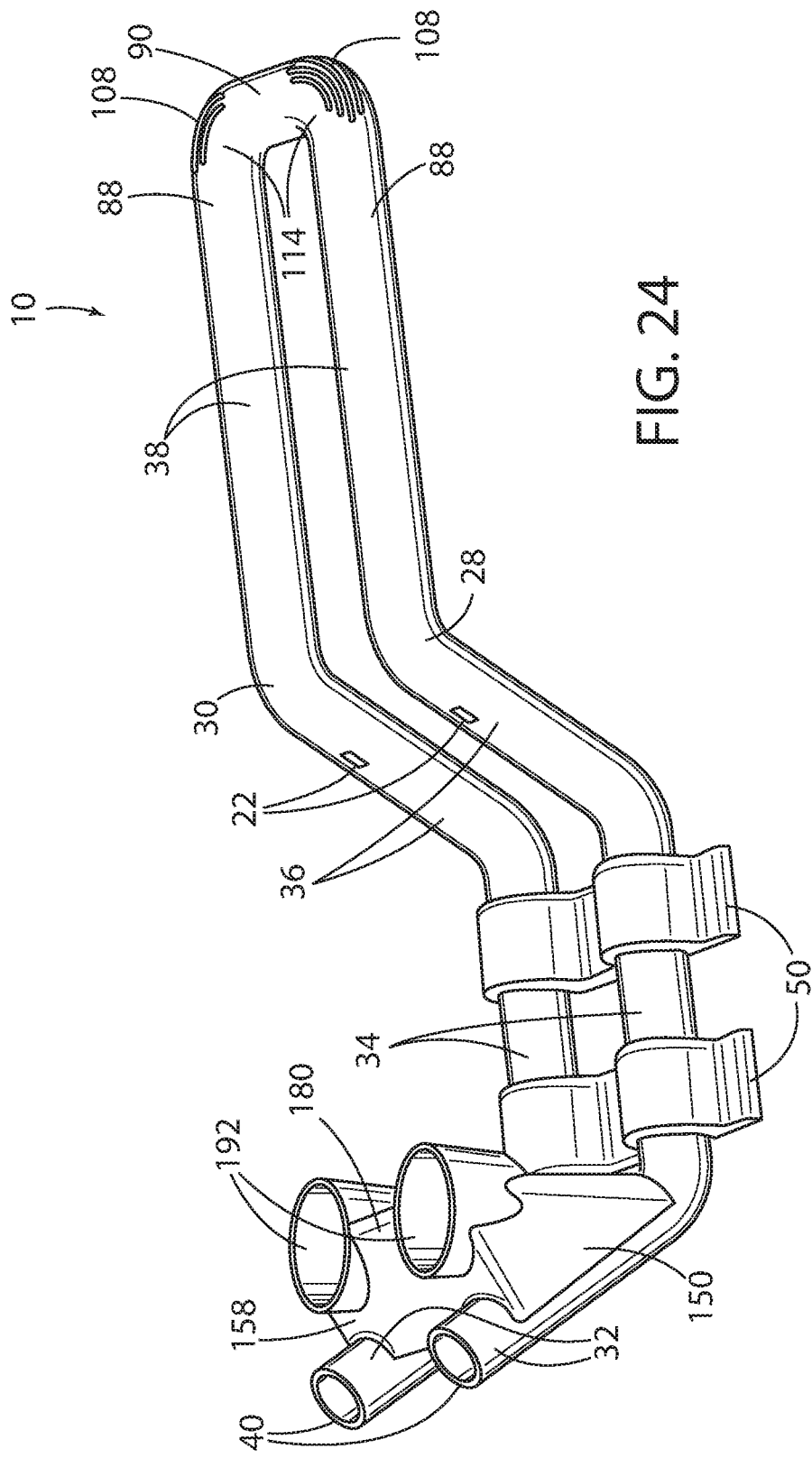
FIG. 24 is a perspective side view of another embodiment of the motor vehicle console of the present disclosure, further comprising a transverse member and wherein a cup holder assembly is installed.
Figure 25:
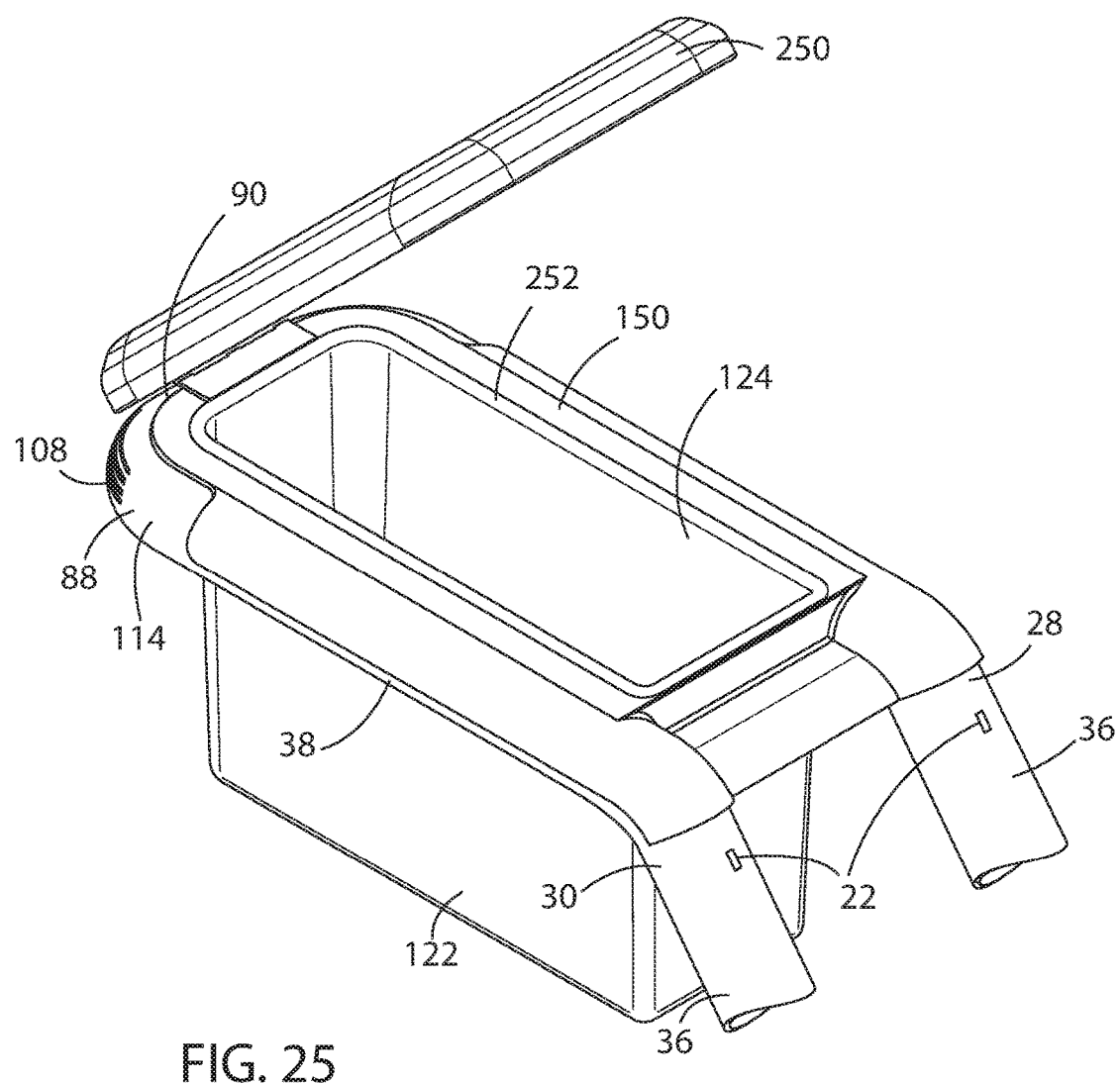
FIG. 25 is a perspective front view of the rear portion of the motor vehicle console of FIG. 24, wherein a storage bin in the open position is installed.
Figure 26:
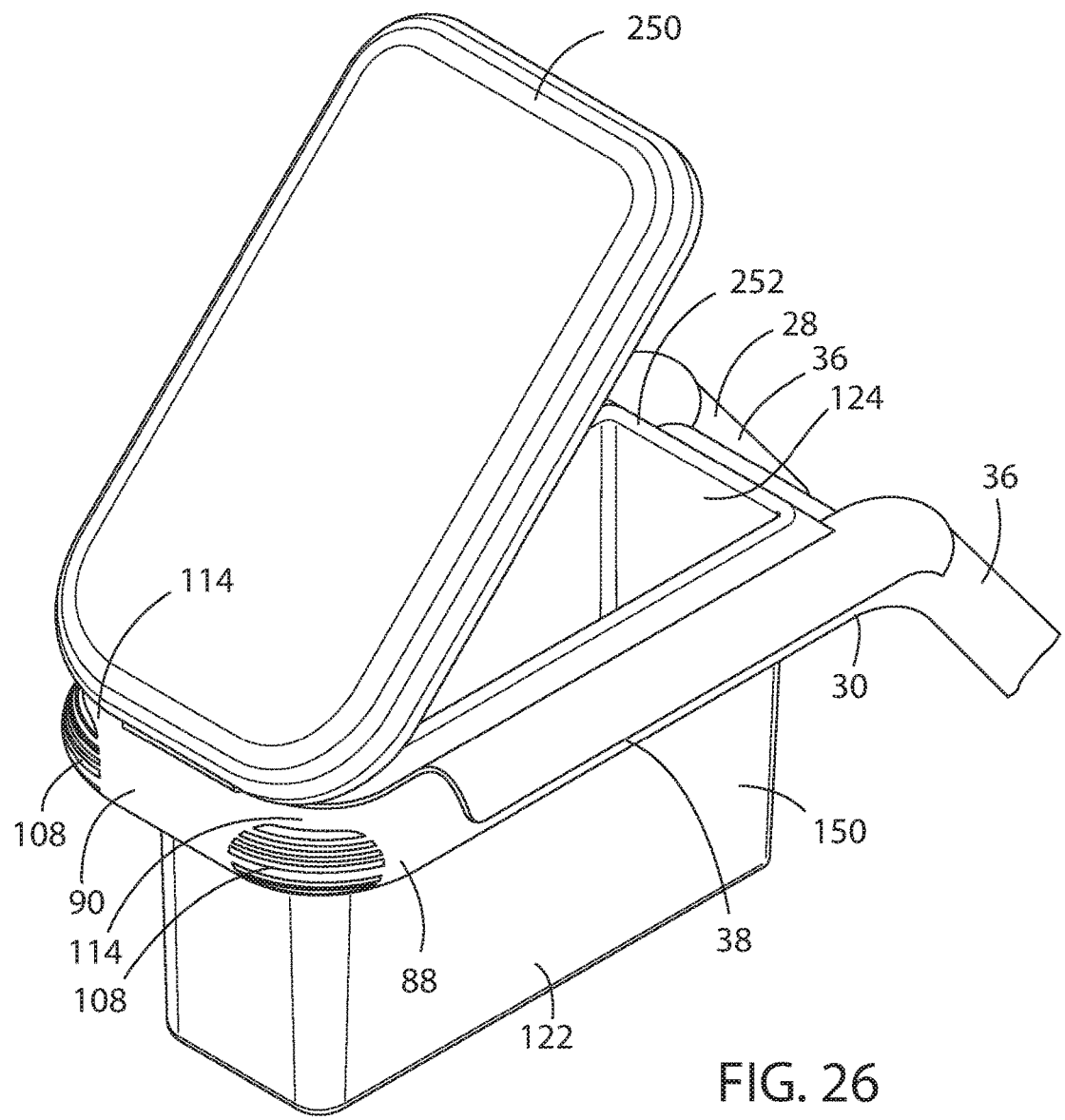
FIG. 26 is a perspective rear view of the rear portion of the motor vehicle console of FIG. 25.
Figure 27:
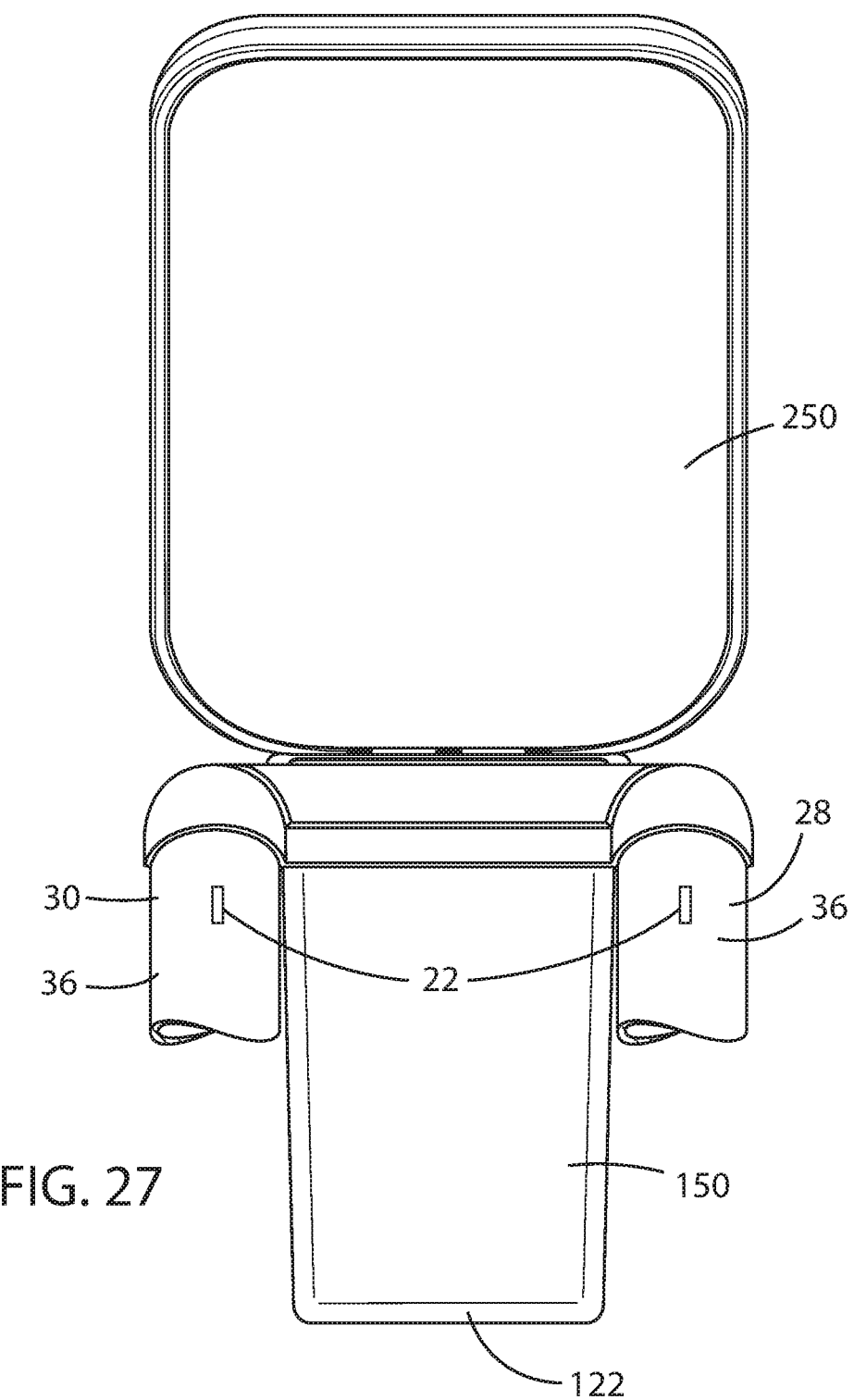
FIG. 27 is a front view of the rear portion of the motor vehicle console of FIG. 25.
Figure 28:
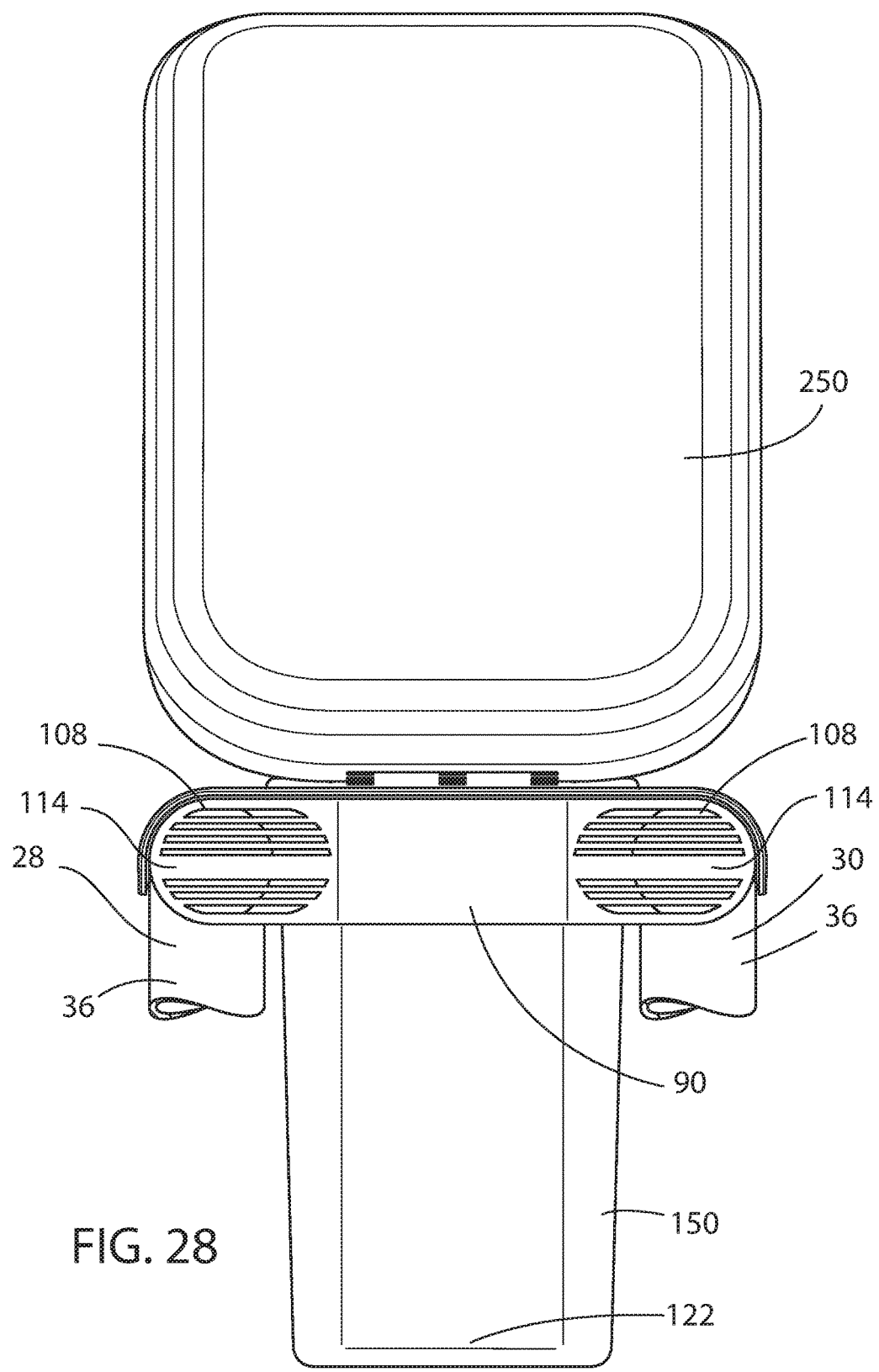
FIG. 28 is a rear view of the rear portion of the motor vehicle console of FIG. 25.
Figure 35:
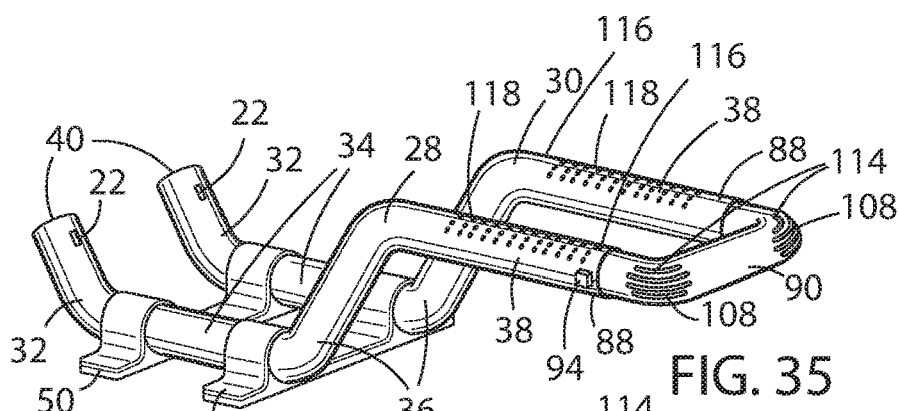
FIG. 35 is a perspective side view of yet another embodiment of the motor vehicle console of the present disclosure, further comprising a slidable transverse member in a fully forward position.
Figure 36:
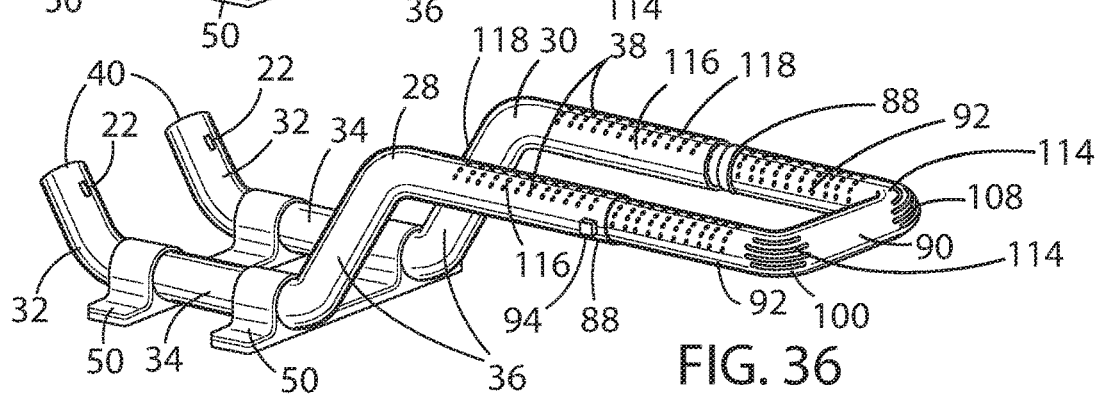
FIG. 36 is a perspective side view of the motor vehicle console of FIG. 35, wherein the slidable transverse member is in a fully rearward position.

The transverse member 90 may be formed integrally with the distal ends 88 of each of the tubular members 28, 30 to effectively form one continuous tube, for example, as shown in FIG. 24. Alternatively, for example, the transverse member 90 may be formed as a separate component, as shown in FIGS. 35 and 36. Preferably, the tubular members 28, 30 and the transverse member 90 are sufficiently rigid and strong enough to allow any person to stand on the transverse member 90 to gain access to the top of the vehicle, such as through a moon roof.

In the case where the transfer member 90 is a separate component, each of the distal ends 88 of the rearward horizontal sections 38 of the tubular members 28, 30 preferably slidably receives one of a pair of forwardly extending tubular members 92 of the transverse member 90, which is preferably U-shaped, as perhaps best seen in FIGS. 35 and 36. Preferably, the transverse member 90 may be moved along the longitudinal axis of the motor vehicle relative the distal end 88 of each of the pair of tubular members 28, 30 between a fully forward position and a fully rearward position. A release button 94 is preferably provided in combination with a detent mechanism (not shown) to secure the transverse member 90 in multiple longitudinal positions between and including the fully forward position and the fully rearward position. As an additional embodiment, the transverse member 90 may be a polymeric component injection molded between each of the pair of tubular members 28, 30 during the process of injection molding the mount 50, as described above.

In each case, the transverse member 90 preferably forms part of the substantially continuous and integral interior cavity 86 within the console. That is, the connector section 32, forward horizontal section 34, intermediate section 36, and rearward horizontal section 38 of each of the pair of exposed parallel tubular members 28, 30 and the transverse member 90 form the substantially continuous and integral interior cavity 86. Thus, the transverse member 90 may be selectively extended rearwardly to protrude further toward the rear seating positions. A further feature of the selectable position of the transverse member 90 is that the natural armrest created by the rearward horizontal section 38 of the tubular members 28,30 can be effectively elongated when the transverse member 90 is extended toward the fully rearward position.

As a particularly advantageous feature of the present disclosure, the transverse member 90 may include a rearwardly facing outer surface 96 and a head impact bezel 98 disposed in and attached to an opening 100 that is laser cut into the rearwardly facing outer surface 96 of the transverse member 90, as shown in FIGS. 29, 30A, and 30B. The head impact bezel 98 may include a bezel backing plate 102 comprised of injection molded polycarbonate (PC), thermoplastic olefin (TPO), polypropylene (PP), acrylonitrile butadiene styrene (ABS), or polybutylene succinate (PBS). Preferably, the bezel backing plate 102 is provided with a plurality of horizontally oriented stress concentrators 104 (or grooves) vertically disposed thereon to control the fracture points of the head impact bezel 98 upon impact. An exposed face 106 of softer material, such as elastomeric polyurethane, preferably forms the rearward facing outer surface 96 of the head impact bezel 98 and a soft material touch point for the console 10. Alternatively, the head impact bezel 98 may be fabricated from thin steel (i.e., 0.5 mm thick) to replace the metal section of the transverse member 90 covered by the head impact bezel 98.

As a further embodiment in accordance with the present disclosure, the interior cavity 86 of the console 10 can also be used as a distribution plenum for the HVAC system 16 of the motor vehicle 2. As noted above, each of the connector sections 32 is preferably operably coupled with the outlet duct 18 of the instrument panel 8 at the first forward end 40, and the rearward end 44 of the connector section 32 is operably coupled with the forward end 46 of the forward horizontal section 34, as shown in FIG. 2A. The connector section 32, forward horizontal section 34, intermediate section 36, and rearward horizontal section 38 of each of the pair of tubular members 28, 30 thus form the substantially continuous and integral interior cavity 86 extending longitudinally relative the motor vehicle 2 that is in fluid communication with and acts as a distribution plenum for the HVAC system 16. In addition, the console 10 further includes one or more airflow vents 108 in fluid communication with the interior cavity 86 of the console 10.

As shown in FIGS. 9, 10, 12, 14, 15, 17-19, and 45-47, the airflow vent 108 may be disposed on the distal end 88 of each of the rearward horizontal sections 38, which may be further provided with a plastic or steel cap 110 to form the airflow vent 108. The airflow vent cap 110 may include a collar that is sized to fit within or around the distal end 88 of each of the rearward horizontal sections 38, depending on the styling dictates of the passenger compartment 6, and is preferably provided with an air register deflection mechanism 112 by which the airflow direction from the airflow vent 108 can be adjusted, as is known.

Figure 42:
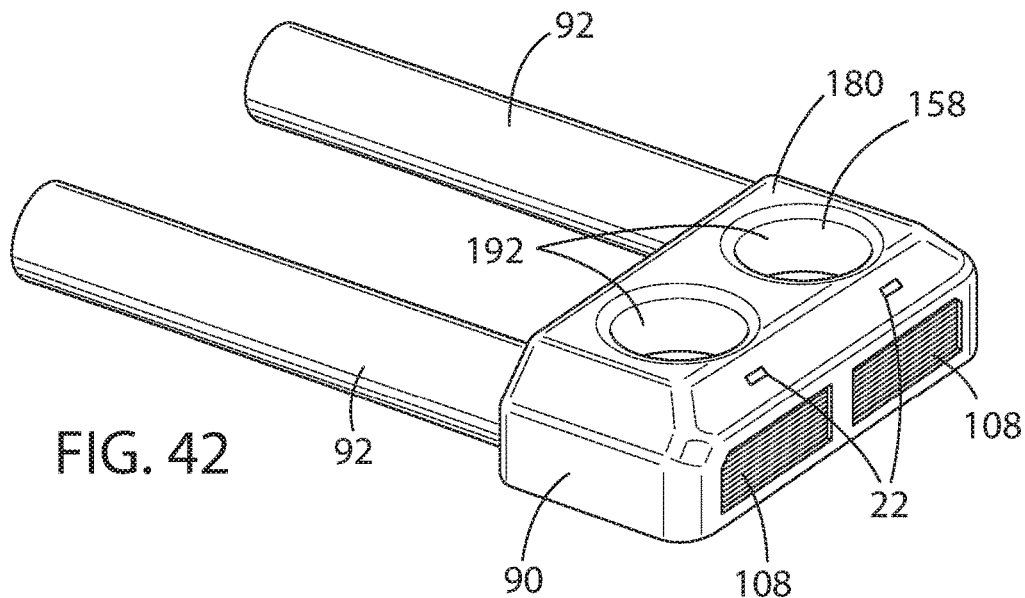
FIG. 42 is a perspective rear view of an embodiment of the transverse member wherein a cup holder assembly is installed.
Figure 44:
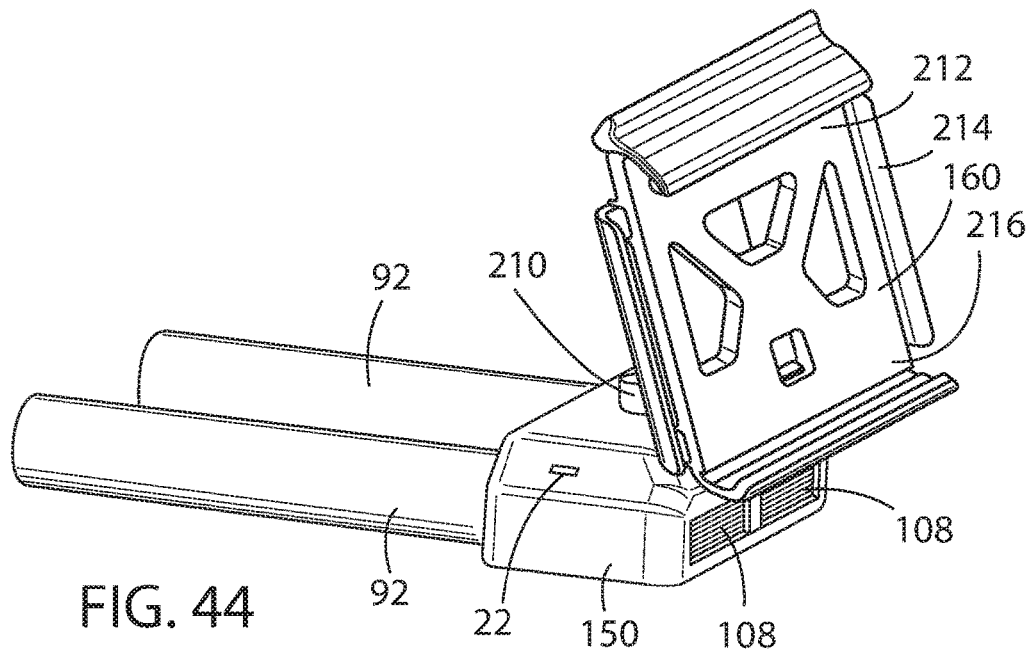
FIG. 44 is a perspective rear view of an embodiment of the transverse member wherein a tablet device clamp assembly is installed.

In the alternative embodiment that employs a transverse member 90, where each of the pair of tubular members 28, 30 is operably coupled one to the other at a distal end 88 of each of the rearward horizontal sections 38 of the pair of tubular members 28, 30 by a transverse member 90, the airflow vent 108 may be disposed on the transverse member 90, for example, as shown in FIGS. 42 and 44. Alternatively, the airflow vent 108 may be disposed on each of the pair of corners 114 formed by the distal ends 88 of the rearward horizontal sections 38 and the transverse member 90, for example, as shown in FIG. 24. Preferably, the airflow vent 108 is laser cut into the metal of the tubular member 28, 30 and/or the transverse member 90 of the console 10 in whatever pattern deemed appropriate for the interior design of the passenger compartment 6. As shown in FIGS. 24 and 35, for example, a pattern of parallel horizontal openings of varying lengths is adopted. Thus, heated or cooled air may be directed from the HVAC system 16 housed in the instrument panel 8 and delivered to the rear seating positions.

As an additional feature of the present disclosure, the rearward horizontal section 38 of the tubular members 28, 30 may be provided with a perforated upper portion 116 defined by a plurality of openings 118 in fluid communication with the interior cavity 86 of the tubular members 28, 30 through which air can flow to the elbow of the driver and/or passenger of the motor vehicle 2 resting on the rearward horizontal section 38, for example, as shown in FIGS. 5, 6, 7, 35, and 36. Openings (not shown) may also be disposed on the sides of the rearward horizontal section 38 to direct airflow to the sides of the driver and/or passenger. Moreover, where the upper portion 116 of the rearward horizontal section 38 of the tubular members 28, 30 includes an elbow pad 120 disposed thereon, as further discussed below, the elbow pad 120 may be cooled or heated by the conduction of heat through the tubular members 28, 30 caused by air flowing through the tubular members 28, 30 to provide increased comfort to the driver and/or passenger of the motor vehicle 2. In addition, airflow vents 108 may be provided through the elbow pad 120 to provide heated or cooled airflow to the elbow of the driver and/or passenger, as shown in FIG. 7.

In addition, it is contemplated that the elbow pad 120 can be mounted to the rearward horizontal section 38 of the tubular members 28, 30 to extend only partially about the outer perimeter 76 of the rearward horizontal section 38 and can be mounted so as to rotate axially about the outer perimeter 76 of the rearward horizontal section 38. The airflow vents 108, comprising a series of small openings, can be disposed in a plurality of radial directions about the outer perimeter 76 of the rearward horizontal section 38, whereby axial rotation of the elbow pad 120 about the outer perimeter 76 of the rearward horizontal section 38 can be used to open or close the airflow vents 108 or series of small openings disposed about the outer perimeter 76 of the rearward horizontal section 38, so as to selectively control the direction of the heated or cooled airflow from the rearward horizontal section 38 of the tubular members 28, 30.

Figure 23B:
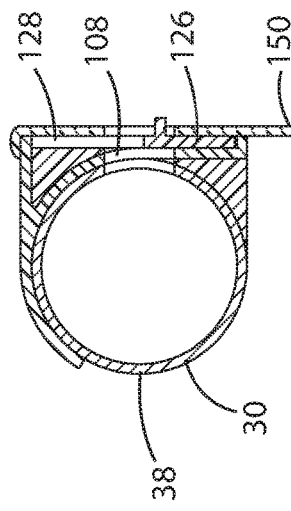
FIG. 23B is a cross-sectional view of the storage bin equipped with an airflow vent of FIG. 23A, taken along the line XXIII B-XXIII B in FIG. 23A, wherein the airflow vent is in the open position.
Figure 23C:
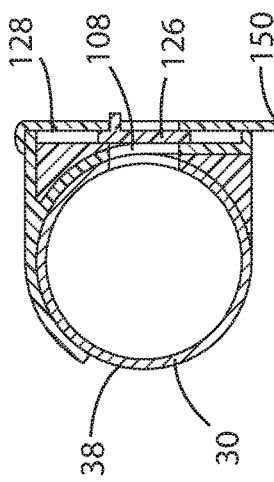
FIG. 23C is a cross-sectional view of the storage bin equipped with an airflow vent of FIG. 23A, taken along the line XXIII B-XXIII B in FIG. 23A, wherein the airflow vent is in the closed position.
Figure 23A:
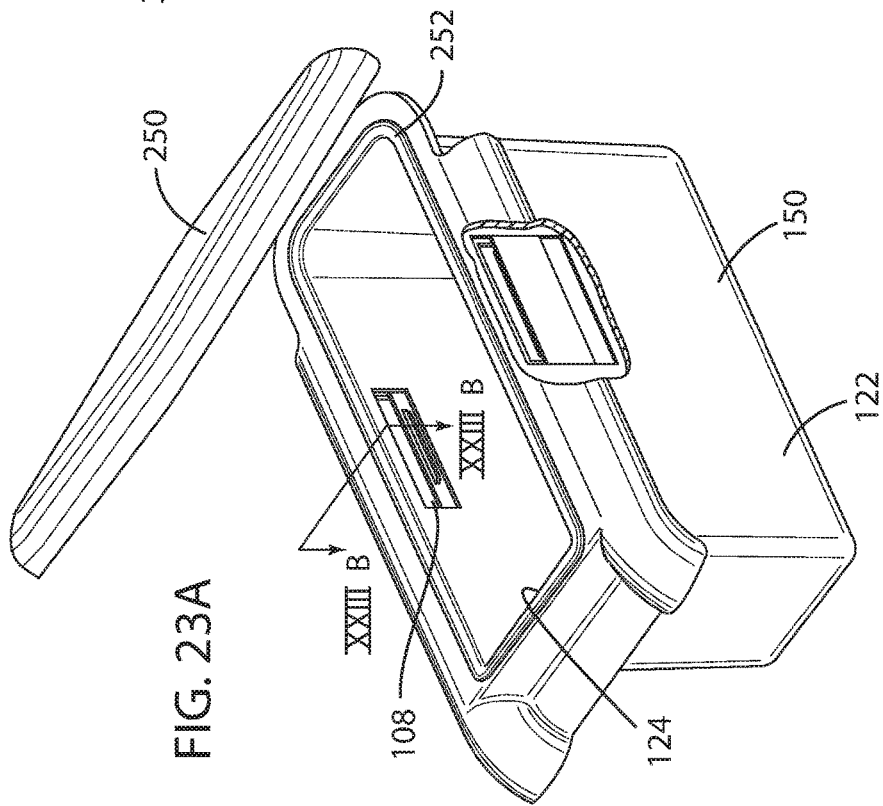
FIG. 23A is a perspective side view of a storage bin equipped with an airflow vent in the open position.

In a further embodiment, a storage bin 122 may be disposed proximate at least one of the pair of tubular members 28, 30 and the pair of tubular members 28, 30 may include an airflow vent 108 in fluid communication with an interior 124 of the storage bin 122. Even more preferably, the storage bin 122 is disposed transversely between the pair of tubular members 28, 30 and each of the rearward horizontal sections 38 of the pair of tubular members 28, 30 further comprise an airflow vent 108 in fluid communication with the interior 124 of the storage bin 122, as shown in FIG. 23A. In this embodiment, the airflow vent 108 in fluid communication with the interior 124 of the storage bin 122 preferably further includes a slidable closure 126 mounted and vertically moveable within a slot 128 between an opened position (shown in FIG. 23B) and a closed position (shown in FIG. 23C) to selectively open and close the airflow vent 108. Thus, heated or cooled air may be directed from the HVAC system 16 housed in the instrument panel 8 and delivered to the interior 124 of the storage bin 122. In effect, and as a particularly advantageous feature, the HVAC system 16 may be combined with the storage bin 122 to act as a refrigerator of sorts and cool objects contained therein.

As a yet another embodiment in accordance with the present disclosure, the console 10 may also be used as a distribution platform for the data transmission network or electrical power supply 20 of the motor vehicle 2 housed within the instrument panel 8. In this embodiment, the connector section 32 is operably coupled with the data transmission network or electrical power supply 20, and the connector section 32, forward horizontal section 34, intermediate section 36, and rearward horizontal section 38 of each of the pair of tubular members 28, 30 form the substantially continuous and integral interior cavity 86 extending longitudinally relative the motor vehicle 2 through which a main data transmission network or electrical power supply line or bus 130 operably coupled with the data transmission network or electrical power supply 20 is disposed, as best shown in FIG. 31. One or more access outlets 22 electrically connected to the main data transmission network or electrical power supply line 130 may be disposed on the pair of tubular members 28, 30.

Figure 32:
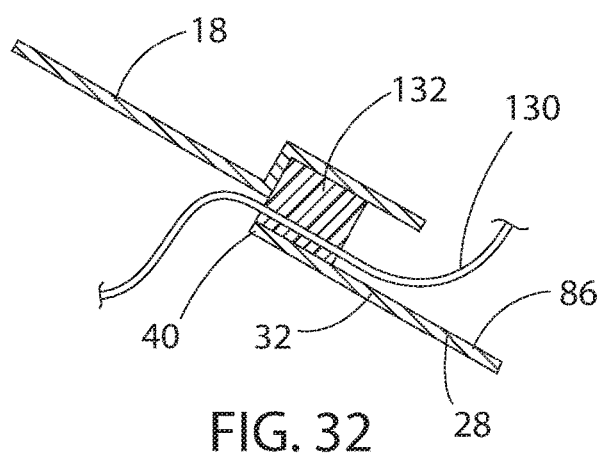
FIG. 32 is an enlarged cross-sectional view of the interface of the connector section of the motor vehicle console of FIG. 31 and the lower portion of the instrument panel.

Preferably, a seal 132 is disposed between the connector section 32 operably coupled with the instrument panel outlet duct 18 at the first forward end 40 of the connector section 32 to seal the entrance of the data transmission line or electrical power supply line 130 extending into the interior cavity 86, as may be seen in FIGS. 31 and 32. Accordingly, particularly when installed on utility vehicles that might encounter operation in bodies of water, the motor vehicle 2 and the console 10 can be submerged to a depth beyond the coupling of the connector section 32 to the instrument panel 8 without admitting water into the interior cavity 86 of the console 10. In this regard, each of the forwardly extending tubular members 92 of the slidable transverse member 90 are preferably provided with O-rings 134 disposed between the forwardly extending tubular members 92 of the transverse member 90 and the rearward horizontal section 38 of the tubular members 28, 30 in order to prevent water from entering into the interior cavity 86 of the console 10, as shown in FIG. 36.

Figure 46A:
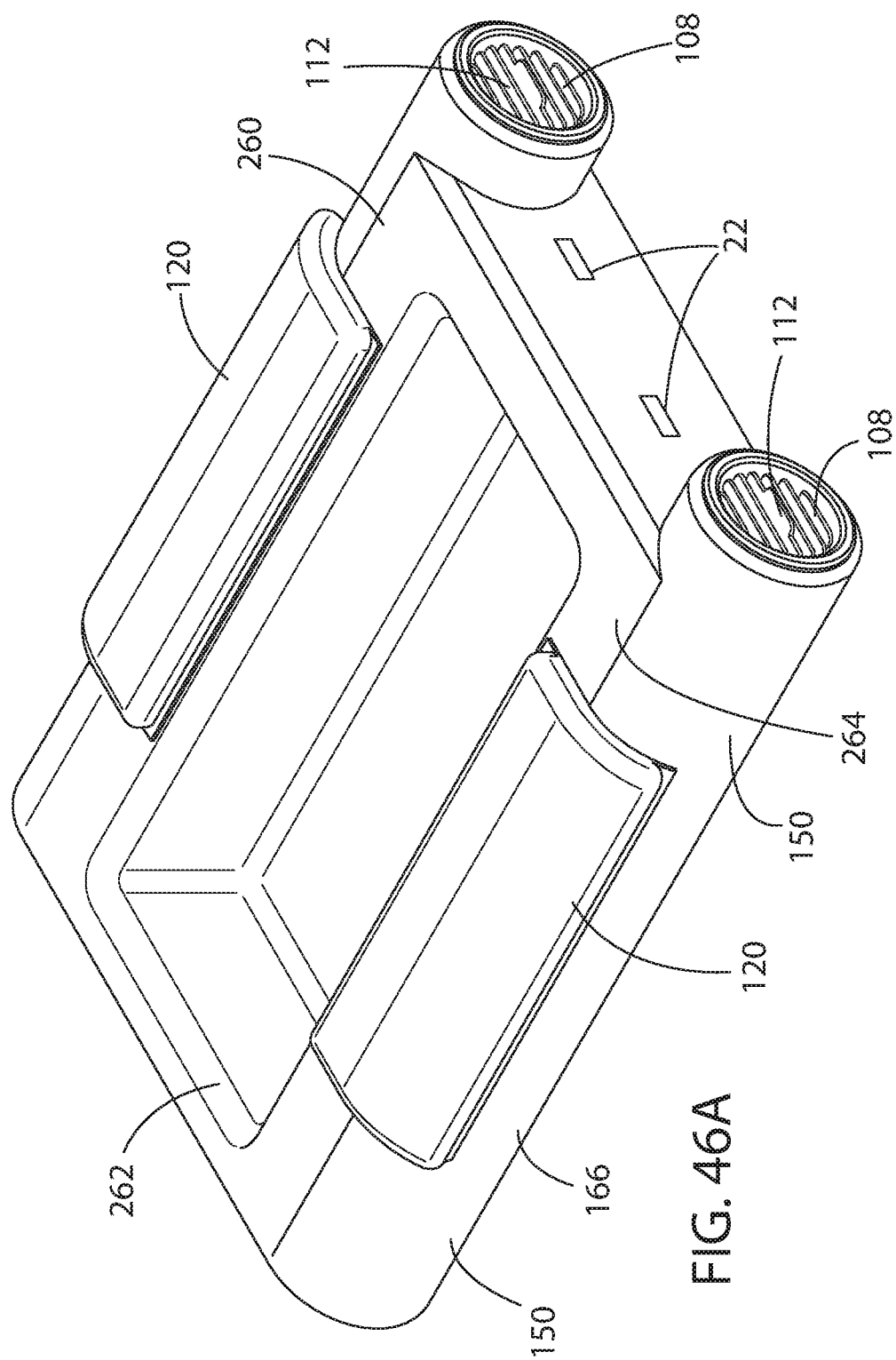
FIG. 46A is a perspective rear view of the shallow bin with elbow pads and rear airflow vents of FIG. 45.
Figure 47:
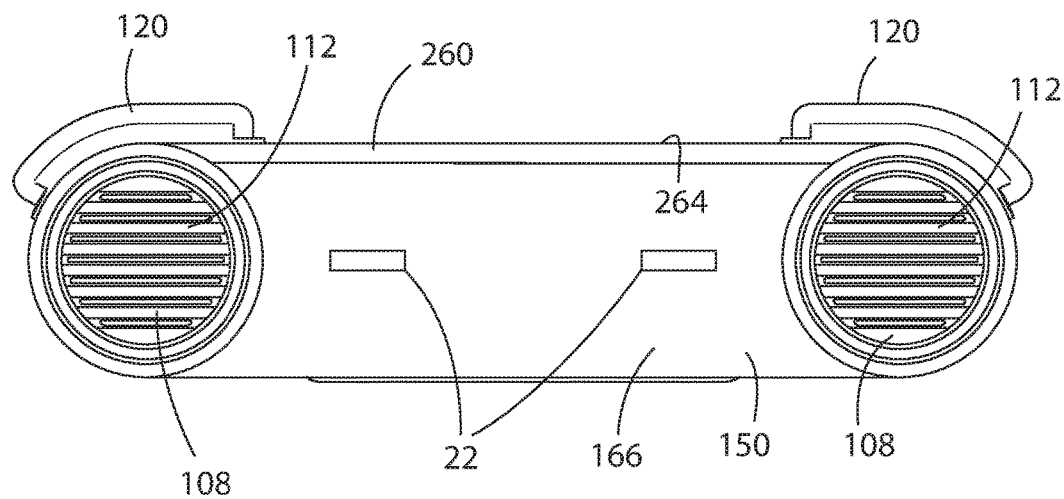
FIG. 47 is a rear view of the shallow bin with elbow pads and rear airflow vents of FIG. 45.

As shown in FIGS. 46A and 47, an access outlet 22 may be disposed proximate the distal end 88 of each of the rearward horizontal sections 38. In the alternative embodiment that employees a transverse member 90, where each of the pair of tubular members 28, 30 are operably coupled one to the other at a distal end 88 of each of the pair of tubular members 28, 30 by a transverse member 90, the access outlets 22 may disposed on the transverse member 90, as shown in FIGS. 29, 30A, and 30C.

As further discussed below, an accessory 150 may be mounted to the pair of tubular members 28, 30, and the access outlet 22 to the data transmission network or electrical power supply 20 may be disposed on the accessory 150, as shown, for example, in FIGS. 12, 14, 16, 18, 20, 21, 33, 34, 40A, 40B, 46A, and 47. A particularly advantageous feature of the console 10 of the present disclosure is the ability to employ a modular design so as to obtain a customizable console 10 fitted to the needs of the driver or passenger of the motor vehicle 2. To this end, one or more accessories 150 may be provided on various locations on the pair of tubular members 28, 30 of the console 10, where the accessories 150 may be either fixedly or detachably mounted to the pair of tubular members 28, 30.

For example, as shown in FIGS. 5, 6, 7, 12, 14, 15, 18, and 19, the accessory 150 may include the elbow pad 120 disposed on the upper portion 116 of each of the rearward horizontal sections 38 of the pair of tubular members 28, 30 to form an armrest. Preferably, the elbow pad 120 disposed on the upper portion 116 of each of the rearward horizontal section 38 of the pair of tubular members 28, 30 comprises an injection molded polymer over-molded to the rearward horizontal section 38 of the pair of tubular members 28, 30, preferably elastomeric polyurethane, to create a cost-effective elbow pad 120. This injection molding process can occur during the process of injection molding the mount 50, as described above. Alternatively, the elbow pad 120 may comprise a gel-type polymer over-molded as a separate molding step. It should be further noted that over-molds can be used in other critical areas to create additional features beyond simply the elbow pads 120, and can provide modular accessory attachment features and soft touch points throughout the length of the pair of tubular members 28, 30 and across the width of the transverse member 90.

As shown in the various Figures, the accessory 150 may further include a touchscreen module 152, closable bin 154, tray assembly 156, cup holder assembly 158, tablet device clamp assembly 160, sling 162, storage bin 122, and shallow bin 166. Various accessories 150 may also be incorporated into the transverse member 90, as described below. Preferably, except as described otherwise herein, each of the accessories 150 is fabricated as a polymeric injected molded body having one of a plurality of removable clamps 170 on each corner thereof. The accessories 150, except as described otherwise herein, are preferably fabricated from injection molded polycarbonate (PC), thermoplastic olefin (TPO), polypropylene (PP), acrylonitrile butadiene styrene (ABS), or polybutylene succinate (PBS). Moreover, it is contemplated that the accessories 150 may be molded in various colors and finishes to match or complement the interior of the passenger compartment 6.

In addition, as noted above the pair of tubular members 28, 30 preferably have a substantially circular cross-sectional outer perimeter and have a substantially continuous diameter along their longitudinal lengths. Each of the removable clamps 170, as shown in FIGS. 11C and 11D, may have a substantially semi-circular recess 172 having an inner periphery 174 and opening width W less than the diameter of the pair of tubular members 28, 30, which are therein received. Preferably, the opening width W is defined by a pair of resilient and flexible opposed edges 176, allowing one of the pair of tubular members 28, 30 to be fittingly received within the semi-circular recess 172 of the removable clamps 170. As an alternative embodiment, in the case of the pair of tubular members 28, 30 being fabricated from steel, the removable clamps 170 can be omitted and each of the accessories 150 may be provided with one or more magnets 168 by which the accessory 150 may be removably attached to the pair of tubular members 28, 30 of the console 10.

Also, the accessories 150 formed as a touchscreen module 152, closable bin 154, tray assembly 156, cup holder assembly 158, tablet device clamp assembly 160, storage bin 122, or shallow bin 166 may be also provided with an access outlet 22. Thus, in order to facilitate the interchangeability of the accessories 150 described herein, one or both of the tubular members 28, 30 may have access outlets 22 disposed along the length of each of the pair of tubular members 28, 30 into which a lead 178 from the accessory 150, upon which itself an access outlet 22 may be disposed, may be electrically connected with the data transmission network or electrical power supply 20 of the motor vehicle 2. Preferably, an access outlet 22 is provided on at least the connector section 32 and intermediate section 36 of each of the pair of tubular members 28, 30. The access outlet 22 is, in turn, in electrical communication with the main data transmission network or electrical power supply 20.

In one embodiment, several of the accessories 150 may be removably and interchangeably mounted to either of the connector section 32 or the intermediate section 36 of each of the pair of tubular members 28, 30. For example, the touchscreen module 152, closable bin 154, cup holder assembly 158, and tablet device clamp assembly 160 may be advantageously interchanged to either a forward or rearward facing direction, driven by the needs of the motor vehicle driver or passenger.

The touchscreen module 152 preferably comprises an interactive electronic device by which information may be displayed and input may be provided to the electronic device. In particular, as shown in FIGS. 38 and 39, it is contemplated that the touchscreen module 152 can be used for control and display on the status of the various motor vehicle systems and the data transmission network, control and display for the vehicle entertainment systems, and control and display of the vehicle navigation system.

The closable bin 154, shown in FIGS. 5, 6, 12, 20-22, 33, 34, 38, 40A, and 40B, is generally contemplated as comprising an enclosed body 180 within which a hinged box 182 is mounted, the hinged box 182 having an upper opening 184 to the interior 186 of the hinged box 182. The hinged box 182 is preferably rotated between an open position to expose the interior 186 of the hinged box 182 and a closed position by which a front fascia 188 is flush with a front surface 190 of the body 180. Articles placed within the interior of the box are thereby secured.

The cup holder assembly 158, shown in FIGS. 4, 9, 10, 14, 15, 18, 19, 20, 21, 22, 24, 41A-4C, and 42, may comprise a body 180 upon which is provided a pair of side-by-side vertically oriented cylindrical recesses 192 on an upper surface 196 thereof. The body 180 can be limited to a simple frame that supports the cylindrical recesses 192, as shown in FIGS. 2 and 24, or an enclosure that includes a closable bin 154, smaller recesses 194 for small loose items, such as loose coins, and access outlets 22, as shown in FIGS. 20 and 21. The cup holder assembly 158 can also be integrated into the transverse member 90, as shown in FIG. 42. The cylindrical recesses 192 are preferably sized to accept common sizes of drink containers.

In another embodiment, the accessories 150 may be removably mounted to the forward horizontal section 34 of each of the pair of tubular members 28, 30. For example, as shown in FIGS. 11B, 12, 14-21, 33, 34, 40A, and 40B, the tray assembly 156 may be mounted so that the upper surface 196 of the tray assembly 156 is level with the horizontal plane. The tray assembly 156 preferably comprises a substantially flat rectangular structure within which is provided a shallow recess 198. As further shown in FIGS. 40A and 40B, for example, the tray assembly 156 may be provided with cutouts 200 on the bottom 202 within which the pair of mounts 50 are received so that the tray assembly 156 may be mounted substantially flush with a floorboard of the motor vehicle. Alternatively, as shown in FIGS. 13-19, the tray assembly 156 may be provided with a pair of connection ears 204 extending outwardly along each lateral side that may be coupled with the opposed ends 66, 68 of the mount 50, for example, via a fastener 206 extending through the connection ear 204 on the tray assembly 156 and into the opposed ends 66, 68 on the mount 50.

The tablet device clamp assembly 160, shown in FIGS. 12-21, 41A, 41B, 43, and 44, preferably comprises a base 210 to which a support frame 212 may be movably attached, preferably through a ball and socket mount (not shown), so as to allow the support frame 212 to swivel side-to-side, to move up and down, and to rotate 360° relative the base 210. The support frame 212 is also preferably provided with a plurality of resilient clips 214 arranged about the outer perimeter 216 thereof and within and by which a tablet device (not shown) may be received and removably supported.

In addition, a bridge module 220, which may include a separate closable storage compartment 222 having a closable lid 224, an open bottom 226, cup holder circular recesses 192, and a small rectangular recess 194 for the temporary storage of smaller articles, can be selectively attached to the pair of tubular members 28, 30 so as to be mounted directly above and in contact with the tray assembly 156, as shown in FIGS. 11A-11D. Preferably, the internal dimensions of the closable storage compartment 222 of the bridge module 220 correspond to the internal dimensions of the shallow recess 198 on the upper surface 196 of the tray assembly 156 to form a substantially continuous interior cavity 228.

In still a further embodiment, several of the accessories 150 may be removably and interchangeably mounted to the rearward horizontal section 38 of each of the pair of tubular members 28, 30. For example, the sling 162, storage bin 122, and shallow bin 166 may be attached to and suspended by the rearward horizontal sections 38. Each of the sling 162, storage bin 122, or shallow bin 166 may include a C-clip 230 extending along each of the pair of opposed longitudinal sides of the sling 162, storage bin 122, or shallow bin 166 that engages the outer perimeter 76 of the rearward horizontal sections 38, as shown, for example, in FIG. 2C. There, the C-clip 230 is preferentially shown disposed around the rearward horizontal section 38 of one of the pair of tubular members 28, 30. An elbow pad 120 may be provided to form the exposed upper surface 232 of the C-clip 230.

In particular, in the case of the sling 162, the C-clip 230 preferably may include a leather exposed upper surface 232 and an inner rigid polymer clip 234 between which polyurethane foam is disposed. As shown in FIGS. 2A, 9, and 10, the sling 162 may be fabricated from a continuous length of leather, cloth, canvas, or a similar flexible material that extends downwardly from each of the rearward horizontal sections 38 of the pair of tubular members 28, 30 and extends laterally between each of the rearward horizontal sections 38 of the pair tubular members 28, 30.

Figure 34:
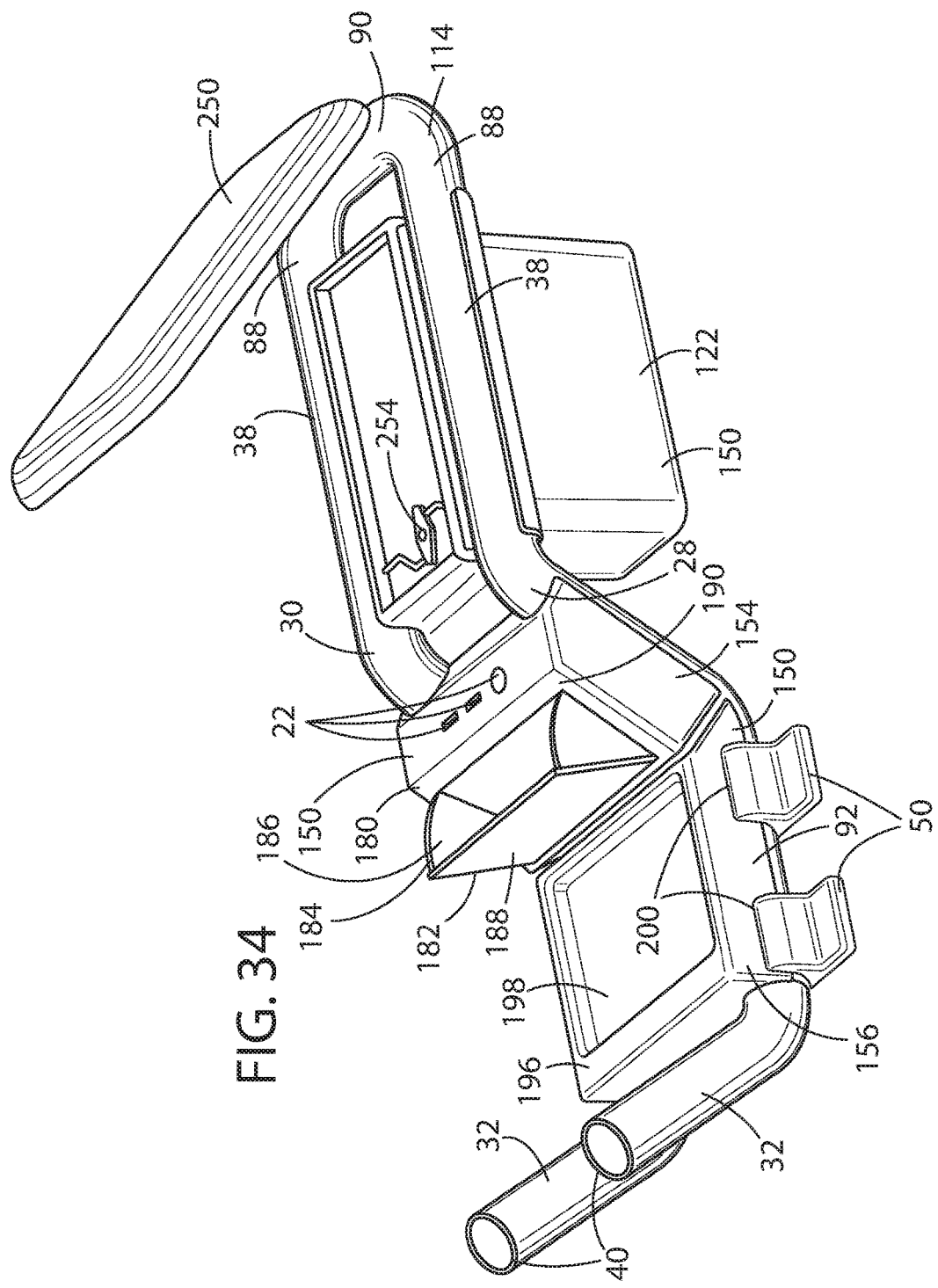
FIG. 34 is a perspective side view of the motor vehicle console of FIG. 33, wherein the closable bin and lockable storage bin are in the open position.

As may be seen in FIGS. 40A and 40B, the storage bin 122 may be provided in varying lengths, which in the embodiments shown, the longer storage bin 122 is preferably approximately 150 mm longer than the shorter storage bin. In the case where the storage bin 122 forms an open compartment, as also shown in FIGS. 40A and 40B, the longitudinal sides can be formed from a gel-type polymer to provide support as an elbow pad 120. In addition, as noted above, the storage bin may be provided with a closable lid 250 and heated or cooled. Further, the storage bin may be made waterproof by the use of a closable lid 250 and a seal 252 around the opening of the interior of the storage bin 122. Finally, the storage bin may be used to secure valuable articles by the use of the closable lid 250 and a lock 254, as shown in FIG. 34. When used as a device by which valuables may be secured, the storage bin 122 and closable lid 250 is preferably constructed of carbon fiber polymers. As an additional advantageous feature of the storage bin 122, when provided with a closable lid 250, the closable lid 250 may have a padded upper exposed surface when in the closed position to act as an armrest. Again, the upper surface 196 may be padded with a gel-type polymer to provide support as an armrest.

Figure 45:
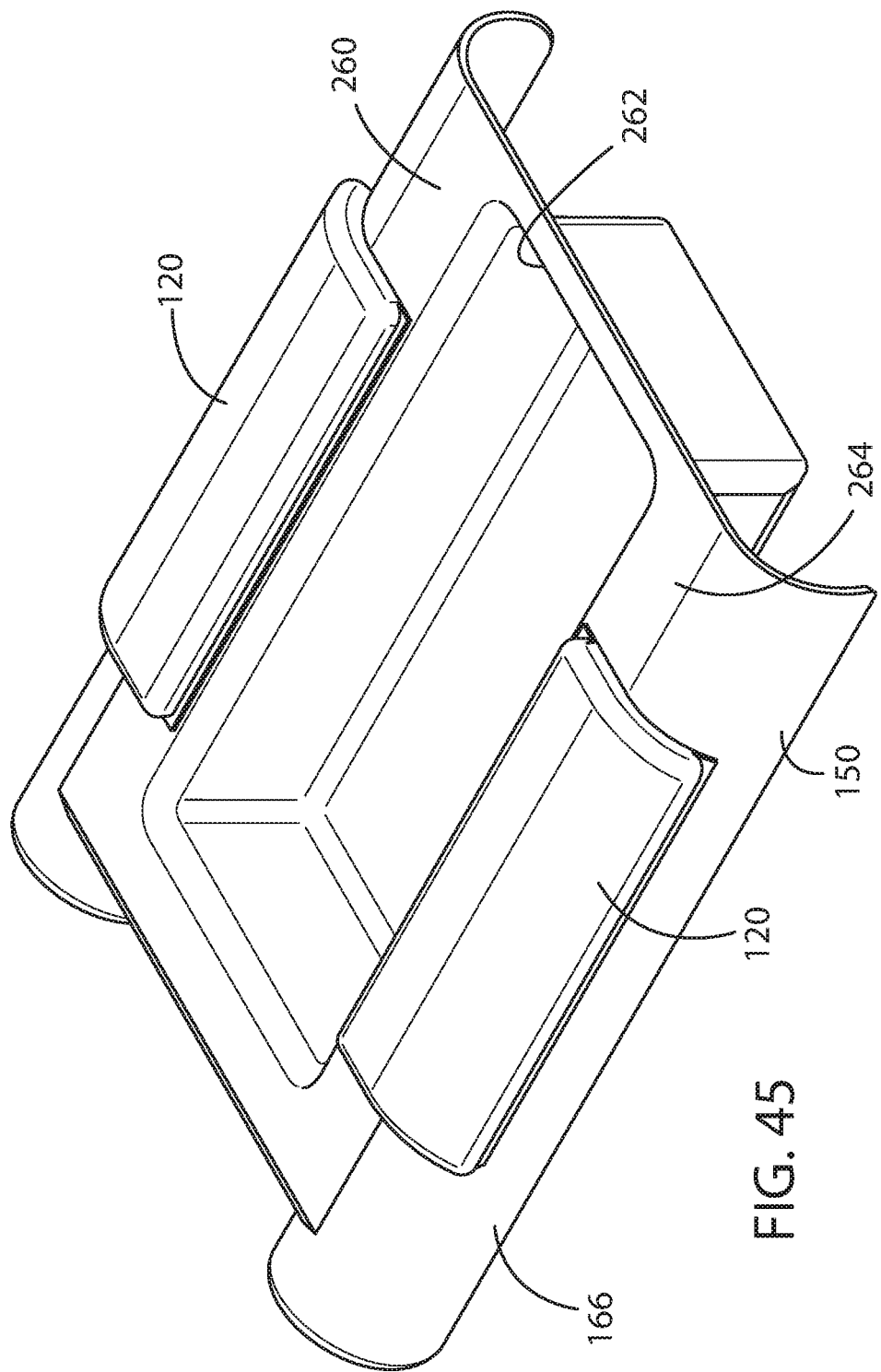
FIG. 45 is a perspective front view of a shallow bin with elbow pads and rear airflow vents for attachment to the rearward horizontal sections of the motor vehicle console of FIG. 1.
Figure 46B:
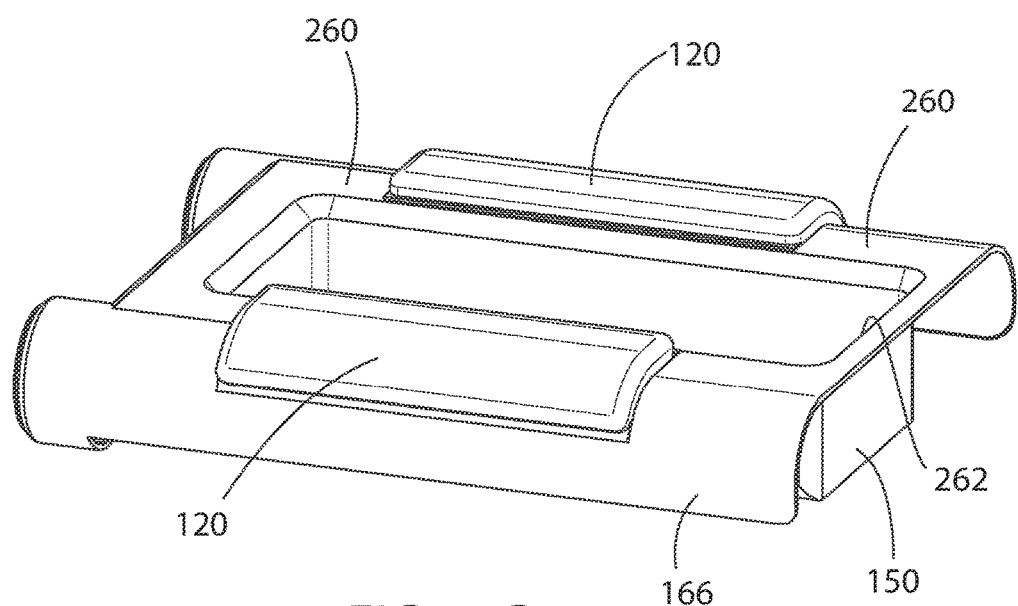
FIG. 46B is a perspective rear view of the shallow bin with elbow pads and rear airflow vents of FIG. 45.

As shown in FIGS. 45-47, the shallow bin 166 may form a substantially planar body 260 within which a shallow longitudinal recess 262 is provided. Preferably, C-clips 230 extend laterally from either longitudinal side along the length of the shallow bin 166. The shallow bin 166 may also be provided with elbow pads 120 on the exposed upper surface 264, which, as noted previously, are preferably formed as an elastomeric polyurethane material or a gel-type material. The shallow bin 166 disclosed in FIGS. 45-47 is adapted for installation to the distal end 88 of the rearward horizontal section 38 of the pair of tubular members 28, 30 without a transverse member 90, and preferably further includes rear airflow vents 108 having an air register deflection mechanism 112 for providing heated or cooled airflow to the rear seating positions.

As an additional feature of the present disclosure, several of the accessories 150 may be incorporated into or fabricated as the transverse member 90 slidably received within the distal end 88 of each of the pair of tubular members 28, 30, where the accessory 150 may be adapted for longitudinal movement relative the distal end 88 of each of the pair of tubular members 28, 30. As best shown in FIGS. 41A-44, for example, a cup holder assembly 158 or a tablet device clamp assembly 160 may be constructed to form or be attachable to the transverse member 90 slidably received within the distal end 88 of each of the pair of tubular members 28, 30. A pair of parallel tubular members 92 preferably extends forward of the cup holder assembly 158 or tablet device clamp assembly 160 and are slidably received within the distal end 88 of the rearward horizontal section 38 of the pair of tubular members 28, 30.

Figure 41A:
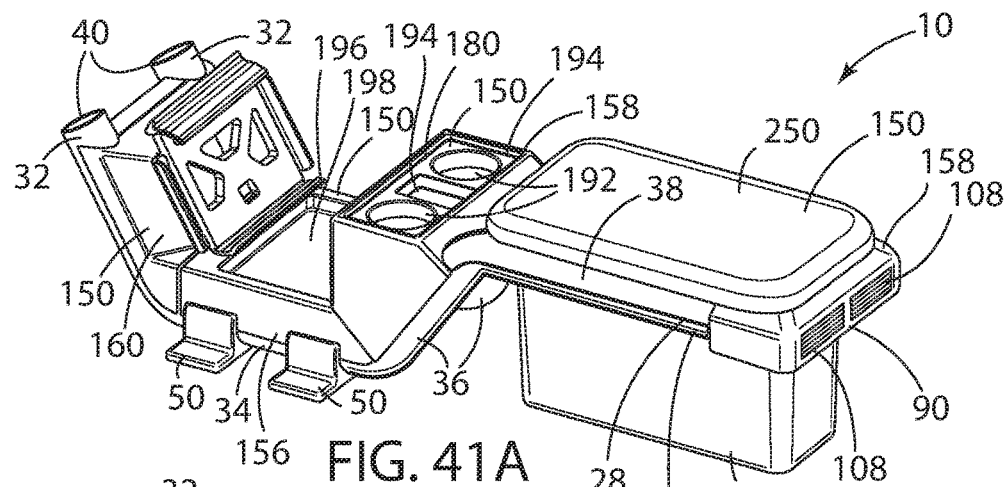
FIG. 41A is a perspective side view of a further embodiment of the motor vehicle console of the present disclosure, wherein the tablet device clamp assembly, tray assembly, cup holder, storage bin, and retractable transverse member comprising a cup holder in the fully forward position are installed.
Figure 41B:
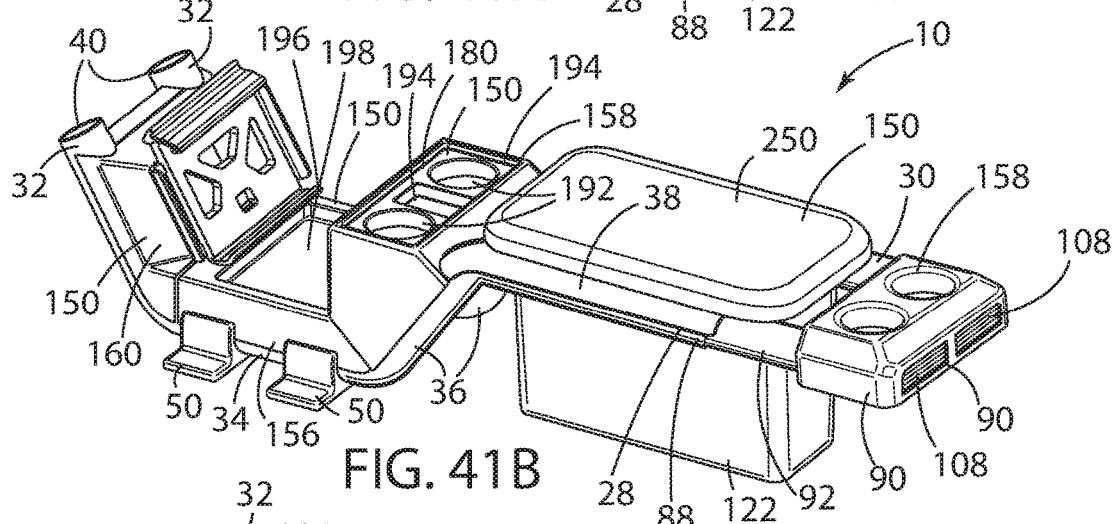
FIG. 41B is a perspective side view of the motor vehicle console of FIG. 41A, wherein the retractable transverse member is in the fully rearward position.
Figure 43:
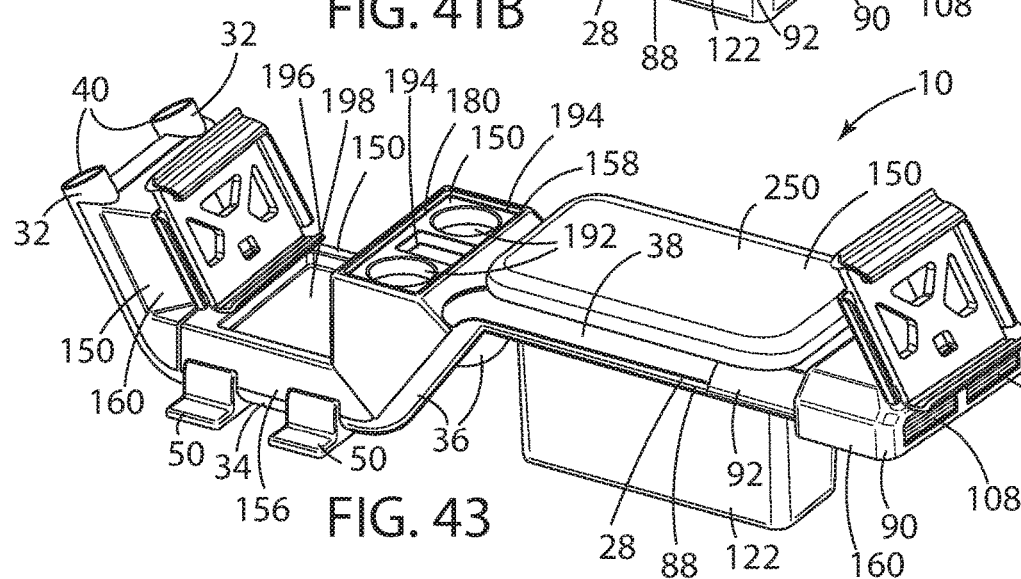
FIG. 43 is a perspective side view of a further embodiment of the motor vehicle console of the present disclosure, wherein the tablet device clamp assembly, tray assembly, cup holder, storage bin, and retractable transverse member comprising a tablet device clamp assembly in the fully rearward position are installed.

In the case of the tablet device clamp assembly 160, the tablet device clamp assembly 160 may be detached from the transverse member 90 prior to the transverse member 90 being fully slid to its forward position, as shown FIG. 41A. In the case of the embodiments where the accessories 150 are incorporated into the transverse member 90, the transverse member 90 is preferably provided with an access outlet 22 to the data transmission network or electrical power supply 20. This is particularly so in the case where the accessory 150 comprises the tablet device clamp assembly 160, but also applies when the accessory 150 comprises the cup holder assembly 158, as shown in FIGS. 42 and 44.

Figure 14:
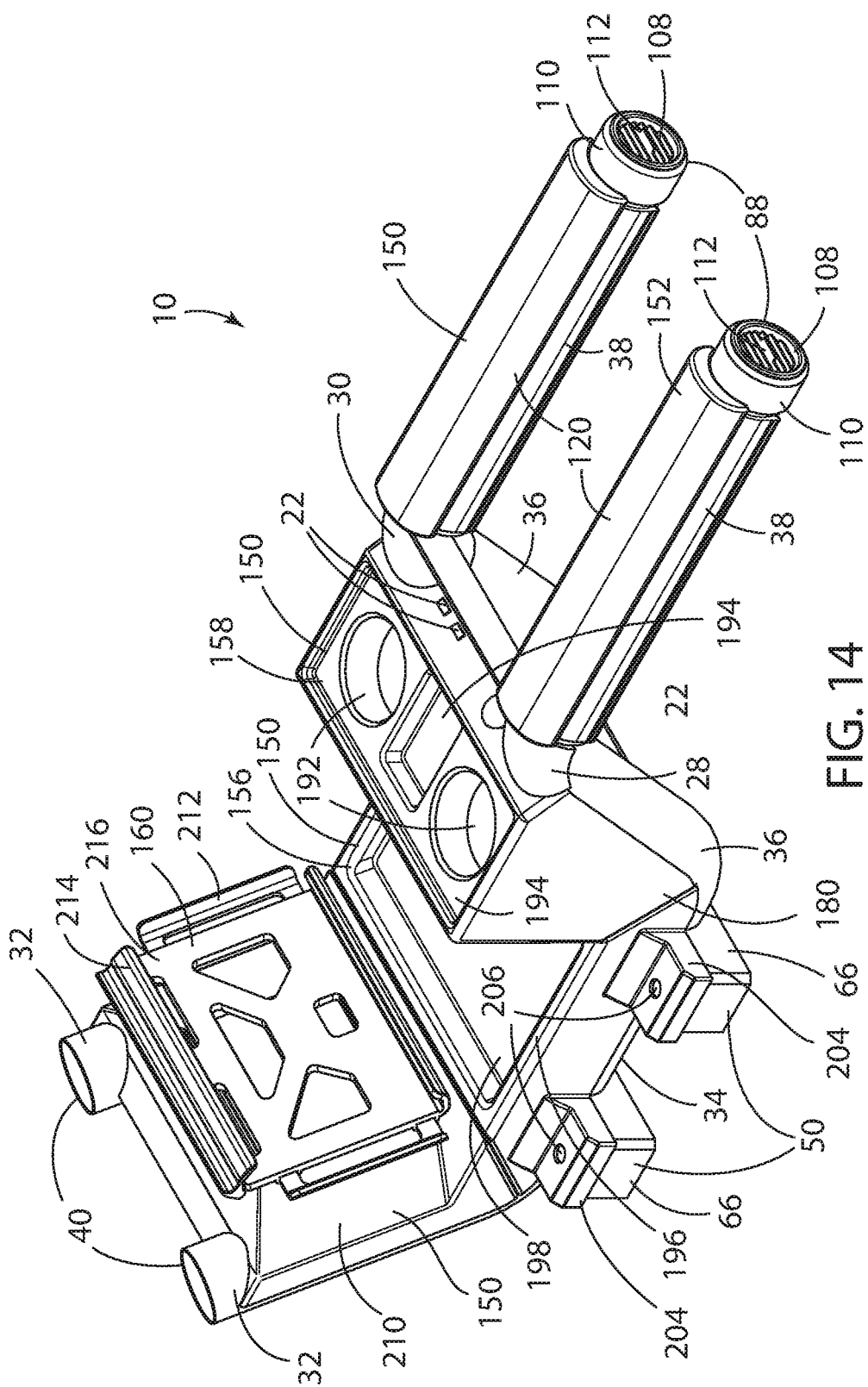
FIG. 14 is a perspective side rear view of the motor vehicle console of FIG. 1, wherein the tablet device clamp assembly, tray assembly, cup holder assembly, and elbow pads are installed.
Figure 15:
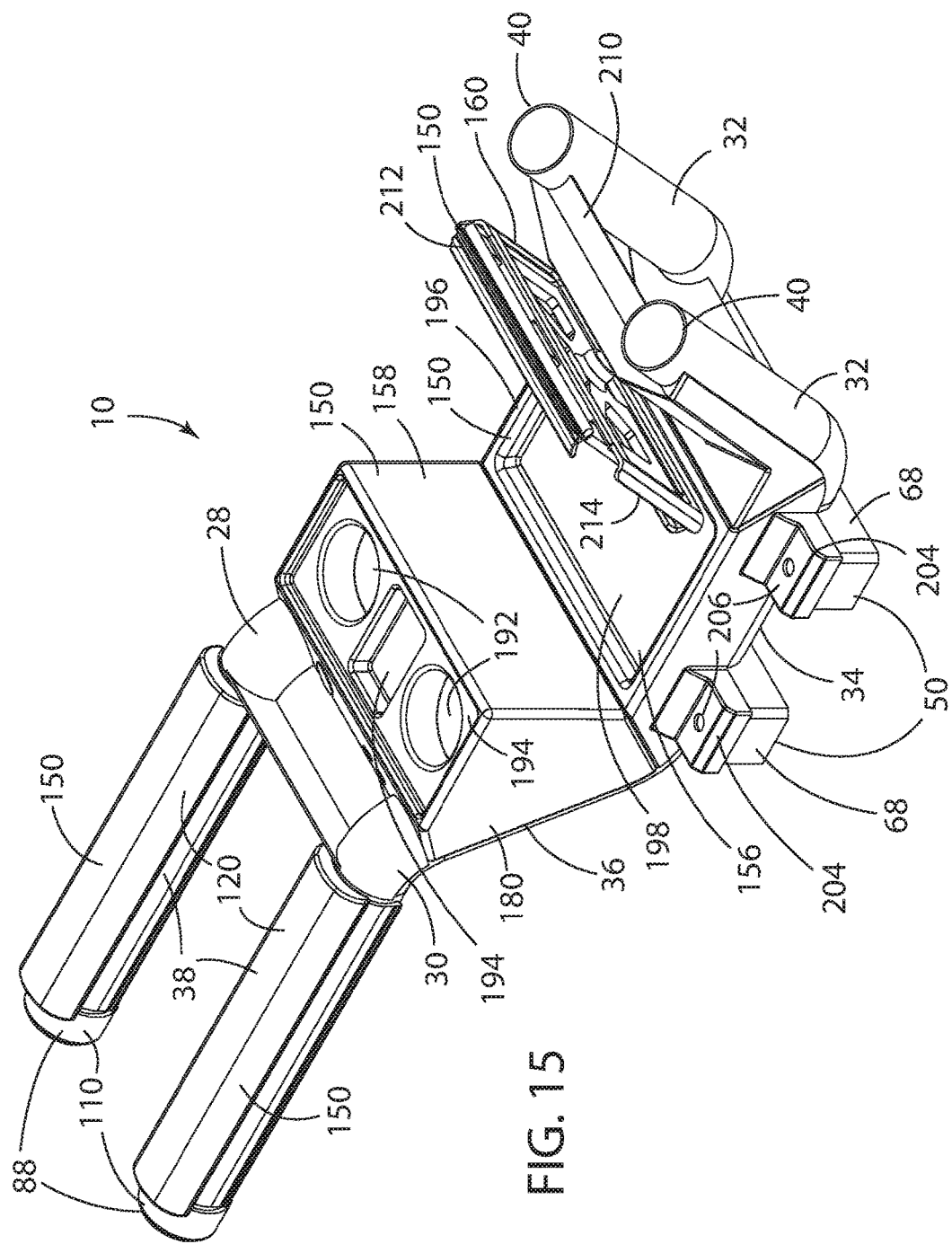
FIG. 15 is a perspective side front view of the motor vehicle console of FIG. 14.
Figure 16:
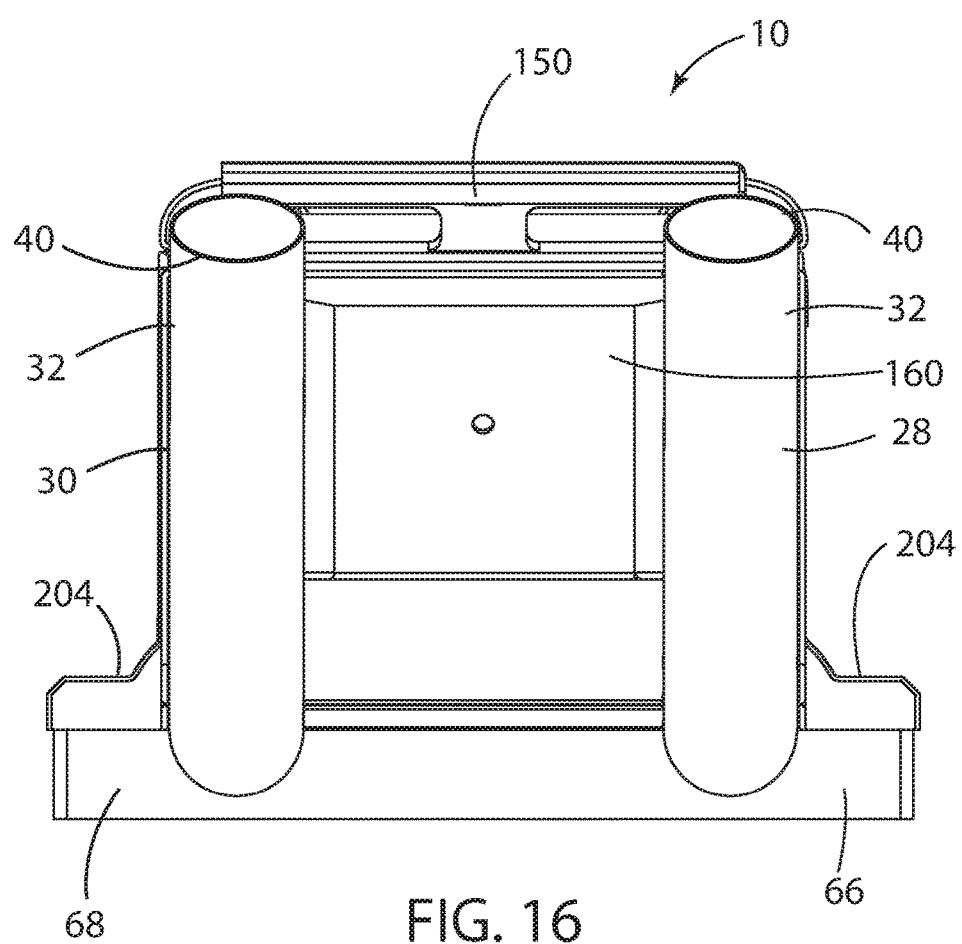
FIG. 16 is a front view of the motor vehicle console of FIG. 14.
Figure 17:
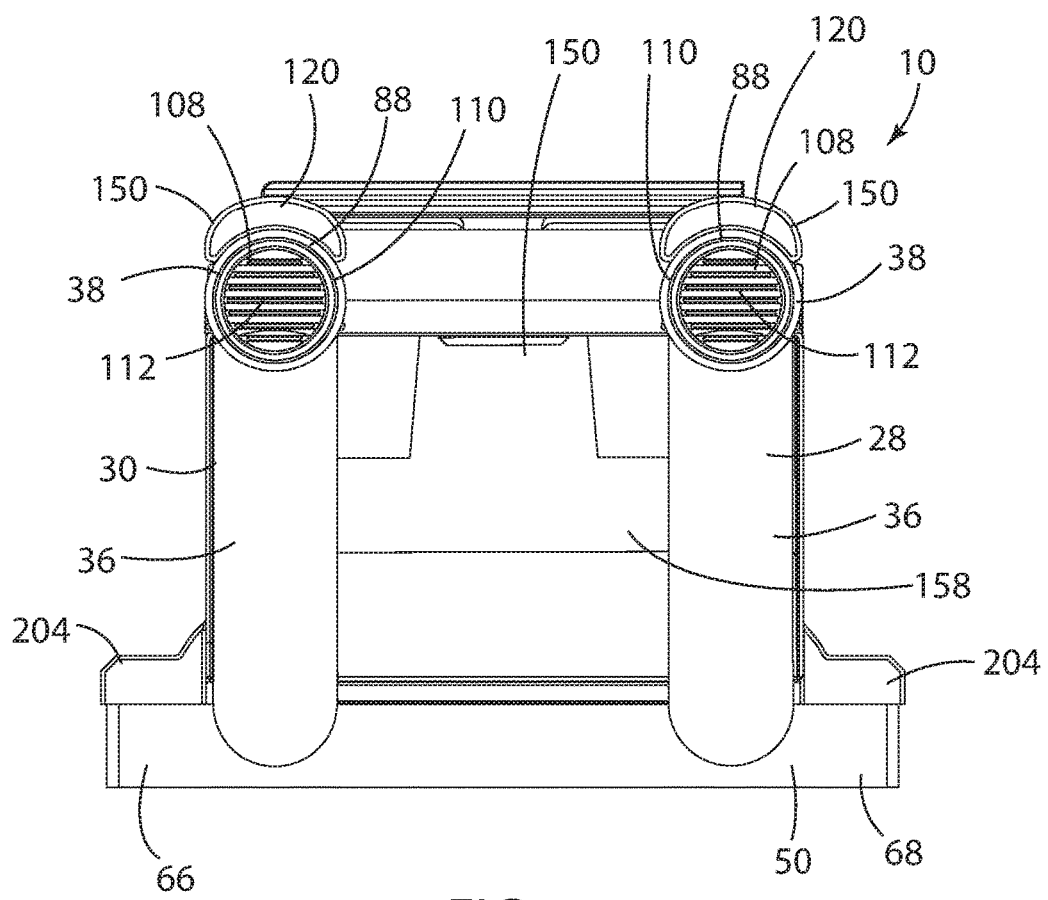
FIG. 17 is a rear view of the motor vehicle console of FIG. 14.
Figure 18:
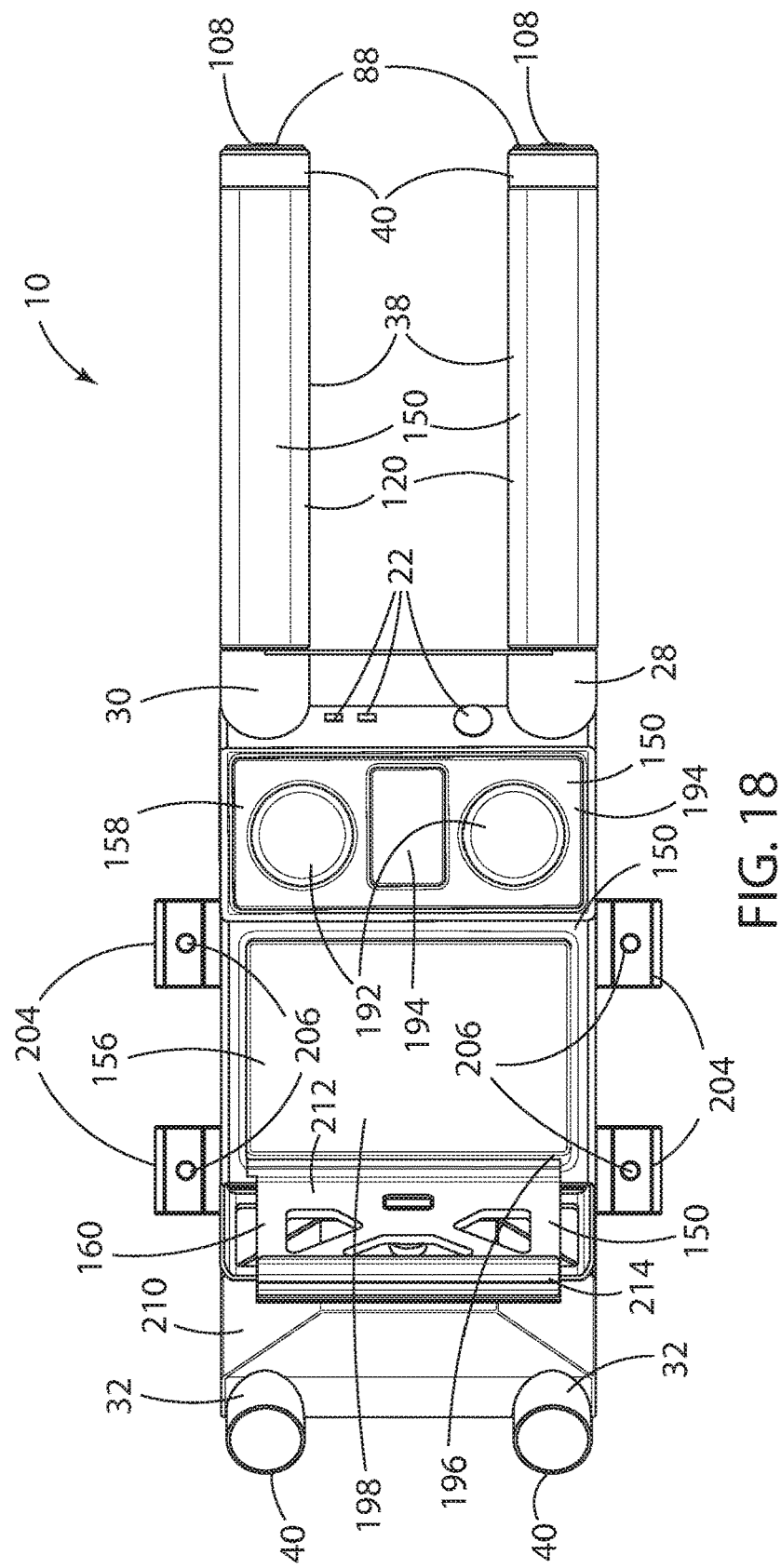
FIG. 18 is a top view of the motor vehicle console of FIG. 14.
Figure 33:
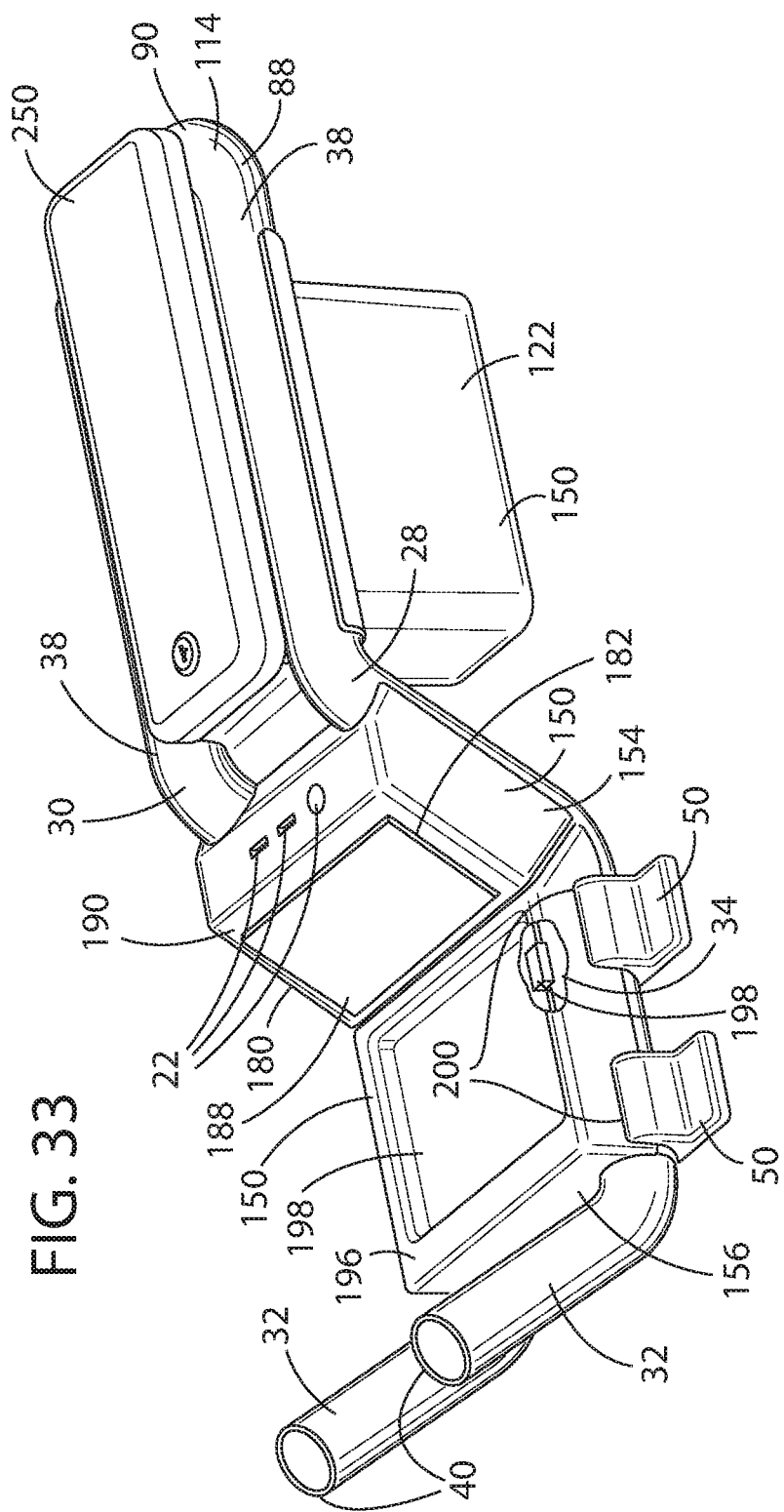
FIG. 33 is a perspective side view of the motor vehicle console of FIG. 29, wherein the tray assembly, closable bin in the closed position, and lockable storage bin in the closed position are installed.

In accordance with the present disclosure, a high level of modularity may be obtained in the design and layout of the console 10. For example, the cup holder assembly 158 may be moved from a forward to a rearward position in order to accommodate the shifter assembly 84 mounted to the overmolded mounts 50. In addition, the tablet device clamp assembly 160 can be removed from the connector section 32, as shown in FIG. 12, and replaced with a touchscreen module 152, as shown in FIG. 38, while the cup holder assembly 158 mounted to the intermediate section 36, as shown in FIG. 14, can be replaced with the closable bin 154, as shown in FIGS. 33-34. Thus, an extraordinarily high level of interchangeability and customer customization is provided by the present disclosure. The interchangeability of the various accessories 150 may be obtained directly by the driver or passenger of the motor vehicle 2, or may be modified at the dealership. In the former case, the motor vehicle owner may essentially custom build the console 10 to the owner's particular needs.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A console for a motor vehicle comprising:
    a mount; and
    a pair of exposed parallel tubular members, each of the tubular members having a forward horizontal section, an intermediate section extending rearwardly in at least partially an upward direction, and a rearward horizontal section, wherein each forward horizontal section is disposed at an elevation horizontally below the rearward horizontal section and each forward horizontal section is operatively coupled with the mount.

2. The motor vehicle console of claim 1, wherein a rearward end of the forward horizontal section is operatively coupled with a forward end of the intermediate section and a rearward end of the intermediate section is operably coupled with a forward end of the rearward horizontal section, and the intermediate section extends rearwardly and upwardly in about a 45 degree angle relative a horizontal plane.

3. The motor vehicle console of claim 1, wherein the forward horizontal section, intermediate section, and rearward horizontal section of each of the pair of exposed parallel tubular members form a substantially continuous and integral interior cavity extending longitudinally relative the motor vehicle.

4. The motor vehicle console of claim 1, wherein the mount is operably coupled with a floorboard of the motor vehicle.

5. The motor vehicle console of claim 4, wherein the mount extends transversely relative the motor vehicle.

6. The motor vehicle console of claim 1, wherein the mount comprises a substantially planar and elongated lower base and a pair of semi-annular collars operably coupled with and proximate opposed ends of the lower base to define a pair of openings within which the forward horizontal section of each of the pair of exposed parallel tubular members is received and restrained, respectively.

7. The motor vehicle console of claim 6, wherein the lower base and the pair of semi-annular collars are injection molded as a single integrated component around the forward horizontal section of each of the pair of exposed parallel tubular members, respectively.

8. The motor vehicle console of claim 6, wherein the lower base and the pair of semi-annular collars are separate components and the pair of semi-annular collars each further comprise a pair of opposed attachment ears by which the pair of pair of semi-annular collars are operably coupled to the lower base and around an outer circumference of the forward horizontal section of each of the pair of exposed parallel tubular members, respectively.

9. The motor vehicle console of claim 1, wherein the mount comprises a pair of mounts extending transversely relative the motor vehicle and longitudinally spaced one from the other.

10. The motor vehicle console of claim 1, wherein each of the pair of tubular members are operably coupled one to the other at a distal end of each of the pair of tubular members.

11. The motor vehicle console of claim 10, wherein each of the pair of tubular members are coupled at the distal end by a transverse member.

12. The motor vehicle console of claim 11, wherein the transverse member comprises an outer surface and a head impact bezel is disposed about at least a portion of the outer surface of the transverse member.

13. The motor vehicle console of claim 11, wherein the forward horizontal section, intermediate section, and rearward horizontal section of each of the pair of exposed parallel tubular members and the transverse member form a substantially continuous and integral interior cavity.

14. The motor vehicle console of claim 11, wherein the transverse member comprises a polymeric component injection molded between each of the pair of tubular members.

15. The motor vehicle console of claim 1, wherein each of the pair of tubular members comprise a generally circular hydroformed metal tube.

16. The motor vehicle console of claim 1, wherein the tubular members are formed via a CNC process.

17. A console for a motor vehicle comprising:
a mount operably coupled with a motor vehicle and extending transversely relative the motor vehicle; and
a pair of exposed parallel generally circular tubular members, each of the tubular members having a forward horizontal section operably coupled with an intermediate section extending rearwardly in at least partially an upward direction and operably coupled with a rearward horizontal section, wherein each forward horizontal section is disposed at an elevation horizontally below the rearward horizontal section and each forward horizontal section is operatively coupled with the mount, and wherein each of the pair of tubular members are coupled at a distal end of the rearward horizontal section by a transverse member slidably received within the distal end of each of the pair of tubular members, the transverse member being adapted for longitudinal movement relative the distal end of each of the pair of tubular members.

18. The motor vehicle console of claim 17, wherein the mount is operably coupled with a floorboard of the motor vehicle and comprises a substantially planar and elongated lower base and a pair of semi-annular collars operably coupled with and proximate opposed ends of the lower base to define a pair of openings within which the forward horizontal section of each of the pair of exposed parallel tubular members is received and restrained, respectively, and the lower base and the pair of semi-annular collars are injection molded as a single integrated component around the forward horizontal section of each of the pair of exposed parallel tubular members, respectively.

19. A motor vehicle console comprising:
a pair of mounts operably coupled with a motor vehicle and extending transversely relative the motor vehicle; and
a pair of exposed parallel tubular members laterally displaced one from the other, each of the tubular members having a forward horizontal section, an intermediate section extending rearwardly in at least partially an upward direction, and a rearward horizontal section, wherein each forward horizontal section is disposed at an elevation horizontally below the rearward horizontal, and wherein each forward horizontal section of each of the pair of tubular members is operatively coupled with one of the pair of mounts.

20. The motor vehicle console of claim 19, wherein each of the pair of mounts comprise a substantially planar and elongated lower base and a pair of semi-annular collars operably coupled with and proximate opposed ends of the lower base to define a pair of openings within which the forward horizontal section of each of the pair of exposed parallel tubular members is received and restrained, respectively, and wherein the lower base and the pair of semi-annular collars are injection molded as a single integrated component around the forward horizontal section of each of the pair of exposed parallel tubular members, respectively.

* * * * *